(12) United States Patent
Zhu et al.

(10) Patent No.: US 7,840,604 B2
(45) Date of Patent: Nov. 23, 2010

(54) METHOD, APPARATUS AND COMPUTER PROGRAM FOR MANAGING THE PROCESSING OF EXTRACTED DATA

(75) Inventors: Jin Zhu, Falls Church, VA (US); Roger Barney, Fuquay-Varina, NC (US)

(73) Assignee: Precipia Systems Inc., Arlington, VA (US)

( * ) Notice: Subject to any disclaimer, the term of this patent is extended or adjusted under 35 U.S.C. 154(b) by 473 days.

(21) Appl. No.: 11/806,832

(22) Filed: Jun. 4, 2007

(65) Prior Publication Data
US 2008/0301095 A1 Dec. 4, 2008

Related U.S. Application Data

(63) Continuation of application No. 11/806,833, filed on Jun. 4, 2007, now abandoned, and a continuation of application No. 11/806,831, filed on Jun. 4, 2007, now abandoned.

(51) Int. Cl.
*G06F 7/00* (2006.01)
*G06F 17/30* (2006.01)

(52) U.S. Cl. .......................... 707/802; 705/35
(58) Field of Classification Search .................. None
See application file for complete search history.

(56) References Cited

U.S. PATENT DOCUMENTS

| | | | |
|---|---|---|---|
| 6,629,097 B1 | 9/2003 | Keith | |
| 6,694,307 B2 | 2/2004 | Julien | |
| 6,728,707 B1 | 4/2004 | Wakefield et al. | |
| 6,728,728 B2 | 4/2004 | Spiegler et al. | |
| 6,732,097 B1 | 5/2004 | Wakefield et al. | |
| 6,732,098 B1 | 5/2004 | Wakefield et al. | |
| 6,738,765 B1 | 5/2004 | Wakefield et al. | |
| 6,741,988 B1 | 5/2004 | Wakefield et al. | |
| 6,886,010 B2 | 4/2005 | Kostoff | |
| 6,970,881 B1 | 11/2005 | Mohan et al. | |
| 7,401,057 B2 * | 7/2008 | Eder | 706/20 |
| 2002/0194095 A1 * | 12/2002 | Koren | 705/35 |
| 2004/0027349 A1 | 2/2004 | Landau et al. | |
| 2004/0167870 A1 | 8/2004 | Wakefield et al. | |
| 2004/0167883 A1 | 8/2004 | Wakefield et al. | |
| 2004/0167884 A1 | 8/2004 | Wakefield et al. | |
| 2004/0167885 A1 | 8/2004 | Wakefield et al. | |
| 2004/0167886 A1 | 8/2004 | Wakefield et al. | |

(Continued)

OTHER PUBLICATIONS

Hai Leong Chien, et al., "Named Entity Recognition: A Maximum Entropy Approach Using Global Information", Proceeding of the 19th International Conference on Computational Linguistics (Coling 2002), (pp. 190-196), Taipei, Taiwan.

(Continued)

*Primary Examiner*—Cam Y Truong
*Assistant Examiner*—Michael Pham
(74) *Attorney, Agent, or Firm*—Dickstein Shapiro LLP

(57) ABSTRACT

Data is processed at a central data processor using multiple processing steps. The data is processed for the extraction of entities. Relationships between the extracted entities are also extracted. A system map is built using one or more factors derived from the extracted entities and relationships and organized by influence relationships. Each factor is associated with one or more options.

25 Claims, 24 Drawing Sheets

U.S. PATENT DOCUMENTS

| | | |
|---|---|---|
| 2004/0167887 A1 | 8/2004 | Wakefield et al. |
| 2004/0167907 A1 | 8/2004 | Wakefield et al. |
| 2004/0167908 A1 | 8/2004 | Wakefield et al. |
| 2004/0167909 A1 | 8/2004 | Wakefield et al. |
| 2004/0167910 A1 | 8/2004 | Wakefield et al. |
| 2004/0167911 A1 | 8/2004 | Wakefield et al. |
| 2004/0215634 A1 | 10/2004 | Wakefield et al. |
| 2004/0243554 A1 | 12/2004 | Broder et al. |
| 2005/0108256 A1 | 5/2005 | Wakefield et al. |
| 2005/0120009 A1* | 6/2005 | Aker .................... 707/3 |

OTHER PUBLICATIONS

Jure Leskovec, et al., "Learning Sub-structures of Document Semantic Graphs for Document Summarization", LinkKDD 2004, Aug. 2004, Seattle, Washington.

Precipia Systems, Inc., "Diane Digital Analysis Environment", Diane User Manual, 2006, (pp. 1-151).

Dragomir A. Radev, "Text Summarization—Tutorial ACM Sigir", School of Information, University of Michigan, Sheffield, UK, Jul. 25, 2004, www.si.umich.edu.

* cited by examiner

FIG. 10

| | Title | Date | Score |
|---|---|---|---|
| | In February 2004? | 04/12/2004 | 100 |
| | Abstract: Have summarized the world animal sanitary organization of February 2004 ( OIE) to inform, International animal information about the epidemic. Keyword: Animal Information about the epidemic; World animal sanitary organization; OIE-N7squeezes to t | | |
| | Pig Infect Avian flu? | 09/04/2004 | 100 |
| | Display to melt, a report of orchid, have stimulated the nerve of global public sanitary circle. 35 years old she is Chinese farming department courtyard Harbin veterinarian study Yuan the, national reference laboratory of avian flu director. On August 20. | | |
| | PRO/AH:EDR} Avian influenza - China (Hong Kong) (02) | 02/06/2002 | 98 |
| | Color Key AVIAN INFLUENZA - CHINA (HONG KONG) (02) ************************************ A ProMED-mail post (http://www.promedmail.org) ProMED-mail is a program of the International Society for Infectious Diseases (http://www.isid.org) [see also: Avian | | |
| | Deadly bird flu strikes Indonesia | 02/03/2004 | 98 |
| | BBC NEWS | Asia-Pacific | Deadly bird flu strikes Indonesia NEWS SPORT WEATHER WORLD SERVICE A-Z INDEX SEARCH Low Graphics version | Change edition About BBC News | Feedback | Help News Front Page Africa Americas Asia-Pacific Europe Middle East South Asia | | |
| | In January 2004? | 02/23/2004 | 96 |
| | Abstract: Have summarized the world animal sanitary organization of January 2004 ( OIE) to inform, International animal information about the epidemic. Keyword: Animal information about the epidemic; World animal sanitary organization; OIE1 y?0ou ? the Vie | | |
| | BIRD FLU - DETAILS OF BIRD FLU OUTBREAKS ACROSS ASIA - UPDATE | 01/27/2004 | 96 |
| | AFX ASIA FOCUS 26th January 2004 (Adds Pakistan avian flu, Korea update) HONG KONG (AFX-ASIA) - Nine Asian countries are confirmed or believed to have cases of bird flu, which has killed at least seven people and led to the slaughter or death of around 19 | | |
| | WHO examines bird flu transmission | 02/08/2004 | 96 |
| | Yahoo! News - WHO Examines Bird Flu Transmission Yahoo! My Yahoo! Mail Sign in New User? Sign Up News Home - Help Welcome, Guest Personalize News Home Page - Sign in Yahoo! News Sun, Feb 08, 2004 Search News StoriesNews PhotosAudioVideoFull CoverageThe We | | |
| | Department of Agriculture refutes the report of dispatches from foreign news agencies: | 08/24/2004 | 96 |
| | China does not discover that pig infects avian flu The yesterday of Department of Agriculture, discover on its official website for the name China of dispatches from foreign news agencies that the pig infect matter of avian flu issues news bulletin to show: Recently, concerning expert, mention that in 200 | | |
| | WHO confirms fifth death from bird flu in Vietnam | 01/19/2004 | 96 |
| | Budirect.com - World Report Special BruneiDirect.Com. WHO confirms fifth death from bird flu in Vietnam Hanoi - An eight-year-old girl has been confirmed as the fifth person to die in Vietnam from an outbreak of bird flu, the World Health Organization sa | | |
| | Bird flu confirmed in Shanghai | 02/14/2004 | 95 |
| | BBC NEWS | Asia-Pacific | Bird flu confirmed in Shanghai NEWS SPORT WEATHER WORLD SERVICE A-Z INDEX SEARCH Low Graphics version | Change edition About BBC News | Feedback | Help News Front Page Africa Americas Asia-Pacific Europe Middle East South Asia UK | | |
| | PRO/AH} Influenza A virus, basis of human virulence | 09/08/2001 | 95 |
| | Color Key INFLUENZA A VIRUS, GENETIC BASIS OF HUMAN VIRULENCE ************************************ A ProMED-mail post (http://www.promedmail.org) ProMED-mail is a program of the International Society for Infectious Diseases (http://www.i | | |
| | Bird flu confirmed in Shanghai | 02/14/2004 | 95 |
| | BBC NEWS | Asia-Pacific | Bird flu confirmed in Shanghai NEWS SPORT WEATHER WORLD SERVICE A-Z INDEX SEARCH Low Graphics version | Change edition About BBC News | Feedback | Help News Front Page Africa Americas Asia-Pacific Europe Middle East South Asia UK | | |

METHOD, APPARATUS AND COMPUTER PROGRAM FOR MANAGING THE PROCESSING OF EXTRACTED DATA

CROSS-REFERENCE TO RELATED APPLICATIONS

This application is a continuation of U.S. patent application Ser. Nos. 11/806,833 now abandoned and 11/806,831 now abandoned, both filed on Jun. 4, 2007, the contents of which are herein incorporated in their entirety.

BACKGROUND OF THE INVENTION

1. Field of the Invention

The invention is directed towards a system, software and method for managing the extraction and processing of unstructured, semi-structured and structured data.

2. Description of the Related Art

The Internet and other networks contain vast amounts of structured, semi-structured and unstructured data. Structured data is data that can be interpreted according to a schema. Unstructured data has no specific format and may not follow any specific rules. Semi-structured data is data that has some aspects of structured and some aspects of unstructured date Examples of unstructured data include text, video, sound and images.

Searching the Internet and other networks for data is time consuming and often results in retrieval of an abundance of unstructured data. Moreover, Internet content is updated and changed constantly, thus making it increasingly difficult to monitor for updated changes to key data in a user friendly, and efficient manner. A user may perform searches and queries on the Internet to gather data. However, the data retrieved may be unstructured and may require a certain amount of processing before the data is ready to be used the user. Furthermore, the collected and processed data may be out-of-date unless the user periodically updates the collected data with additional searches of the Internet.

Recent innovations include processing tools to construct structured representations of the large amounts of retrieved unstructured data. These tools include natural language processors (NLPs), which further include data extraction engines. Some of these data extraction engines incorporate statistical processing tools, and may include Bayesian theory and/or rule-based learning approaches to extracting key data from unstructured data. Processing the data via NLPs and other types of processing engines is often necessary to transform the unstructured data into a structured data format. The data may be stored in a structured format inside a database, for ready access.

A relational database is well known in the art as a type of database that provides easy access to semi-structured and/or structured data. As data is processed, certain pieces of data, e.g., people and dates, may be identified, captured and processed for future use. For example, the extensible markup language (XML) may be used to syntactically describe the structure of the data. The structured data may be stored in a XML database, allowing future searching and retrieval and preventing the need for repeating processing efforts to regenerate the relevant data or structure. Alternatively, staying with the relational example, information expressed in the extensible markup language (XML) may be parsed and stored in a relational database, allowing future searching and retrieval and preventing the need for repeating processing efforts to regenerate the relevant data or structure A data analyst or user must constantly monitor data sources, e.g., the Internet, for new and updated data. The constant monitoring of data can require large amounts of time and manpower. A user may require updated data to recognize or realize various types of concerns, e.g., important trends, global epidemics, etc., which are constantly changing throughout the world. Furthermore, because search engines offer an abundance of unstructured data, the searching process may be overwhelming to the user.

Finding data efficiently is important to the welfare and lives of people throughout the world. Users rely heavily on data from the Internet and from other private databases, which may also be accessible over the Internet. Some of these databases are third party data providers that organize data by categories, e.g., LexisNexis®. The data obtained over the Internet and from third party data providers may be unstructured, semi-structured and/or structured; however, the data may require further processing before it can be meaningfully displayed to or used by a user.

SUMMARY OF THE INVENTION

Data is processed at a central data processor using multiple processing steps. The data is processed for the extraction of entities. Relationships between the extracted entities are also extracted. A system map is built using one or more factors derived from the extracted entities and relationships and organized by influence relationships. Each factor is associated with one or more options.

BRIEF DESCRIPTION OF THE DRAWINGS

FIG. 10 is an example search result according to one embodiment of the present invention;

FIG. 23 illustrate an exemplary influence loop in an entity network map according to one embodiment of the present invention.

DETAILED DESCRIPTION

Figure 1:
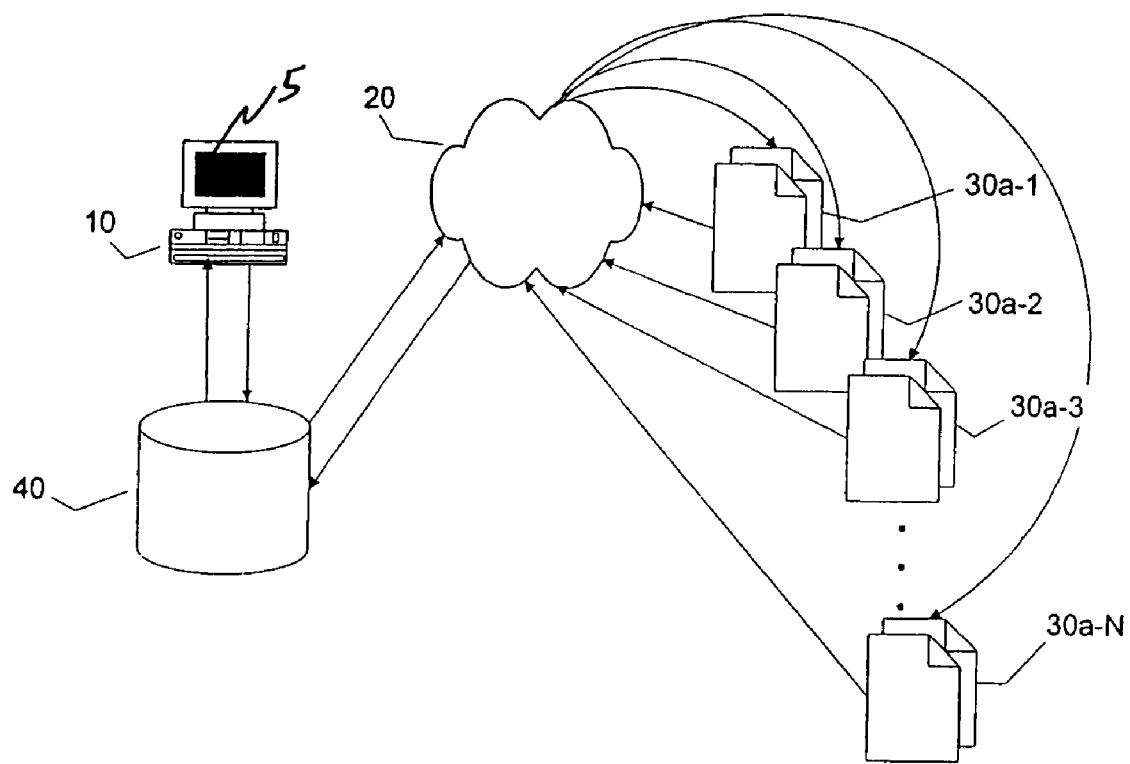
FIG. 1 illustrates a computing system configuration according to an exemplary embodiment of the present invention.

An abundance of electronic data can be found and retrieved via computer workstations and other types of computing devices. The data may be accessible locally, over a network and/or over the Internet. The data retrieved may include unstructured, semi-structured and/or structured data. Once data is retrieved, the data may be processed via one or more structuring operations that place the data into a structured data format that is readily accessible for future processing operations.

Free text, i.e., unstructured, data is commonly found in documents retrieved from searches or from other types of data retrieval operations. The text may include one or more sentences containing nouns, verbs, adjectives, etc. Conversely, the text may have no recognizable grammatical structure such as text commonly found in informal emails or electronic chat dialogues. In order to structure text contained within documents, natural language processors or NLPs may be used. Many types of NLP's are known in the art, including, but not limited to statistical, Bayesian, neural net, and rule-based NLP's.

Natural language processors refer to category of processing engines which are used to analyze unstructured text and to extract certain types of information. Natural language processors may be used as to extract entities from unstructured data. An entity extraction engine, as described in more detail below, extracts important or relevant nouns, magnitudes, and/or numbers from a document. The important or relevant words in a document are termed entities. Examples of entities include, but are not limited to, people (e.g., names), locations (e.g., countries, cities, towns, etc.), organizations (e.g., U.N., U.S.P.T.O., Red Cross, etc.), dates (e.g., years, months, times, etc.), percentages, dollar amounts and/or concepts (e.g., power, control, etc.). The NLP entity extraction engine may, for example, extract entities contained in a document or document set represent the entities in a structured format such as an XML representation, and/or prepare the entity list for storage in a database.

Natural language processors can also be used to identify and extract relationships among and/or between entities from unstructured data. A network extraction engine, as described in detail below, extracts relationships between entities from a document. Such relationships may comprise semantic relationships, social relationships, or any other type of link between entities can be an extracted relationship, including social relationships, html hyperlinks, and other encoded links.

Natural language processors utilize many algorithms known in the art. A Bayesian theory statistical processor analyzes a data document at both the local and the global level, meaning that short text phrases are analyzed according to various constraints including linguistic or rule-based constraints while the entire document is analyzed on a global level for statistical consistency. In this way, both linguistics and statistics are combined to create an effective language processor. One of ordinary skill in the art will recognize and appreciate that many kinds of natural language processing engines exist. In general the preferred type of processing engine is largely a function of the task for which it is employed. In other words, Bayesian theory processors may work quite well in some applications, whereas rule-based processors may be preferred in others. Within the spirit of the present inventive concept, the type of language processor employed is not limited to any one type, but may instead include any processor(s) that work best in a given situation.

FIG. 1 illustrates an exemplary computing system for analyzing unstructured data, according to an exemplary embodiment of the present invention. Referring to FIG. 1, a host computer 10 is used to process a search or query. The host computer 10 may be a regular personal computer (PC) having a central processing unit (CPU), random access memory (RAM), a storage memory such as a hard disk or removable media, and various input devices such as a mouse, a keyboard, etc. The host computer 10 may also be a server or other type of computing device. The central data processor 40 may be located locally on the same local network as the user, or remotely, accessible over a network or networks 20 (FIG. 1). In one embodiment, network 20 comprises the Internet.

A user interface, such as a graphical user interface (GUI) 5 may be displayed to the user such as for prompting the user, displaying captured inputs, and displaying the results of analyses by the system. GUI 5 may utilize a web browser or any known or later developed graphical user interface (GUI) 5 visible on the host computer 10.

Central data processor 40 is in electronic communication with a document set or sets (NOT SHOWN), each set including one or more data documents 30a-1 ... 30a-N, via network 20. A document set is a set of one or more data documents within electronic communication of central data processor 40. A document set may include part or all of the contents of a public website or collection of web-sites. Alternatively, a document set may include part or all of the contents of a local intranet. In another embodiment, a document set may include any one or more documents resident on a local or network file system or available via a document collection, management and/or search tool. In yet another embodiment, the document set may include any one or more documents organized into a project/folder structure within the present system, as described further below. In short, any electronic file that may be retrieved electronically by the present system is envisioned as being capable of being a part of a document set. Data documents 30a-1 ... 30a-N are made available to central data processor 40 for analysis by the various installed analytic engines installed, as described below, and according to the methods described below.

Figure 2:
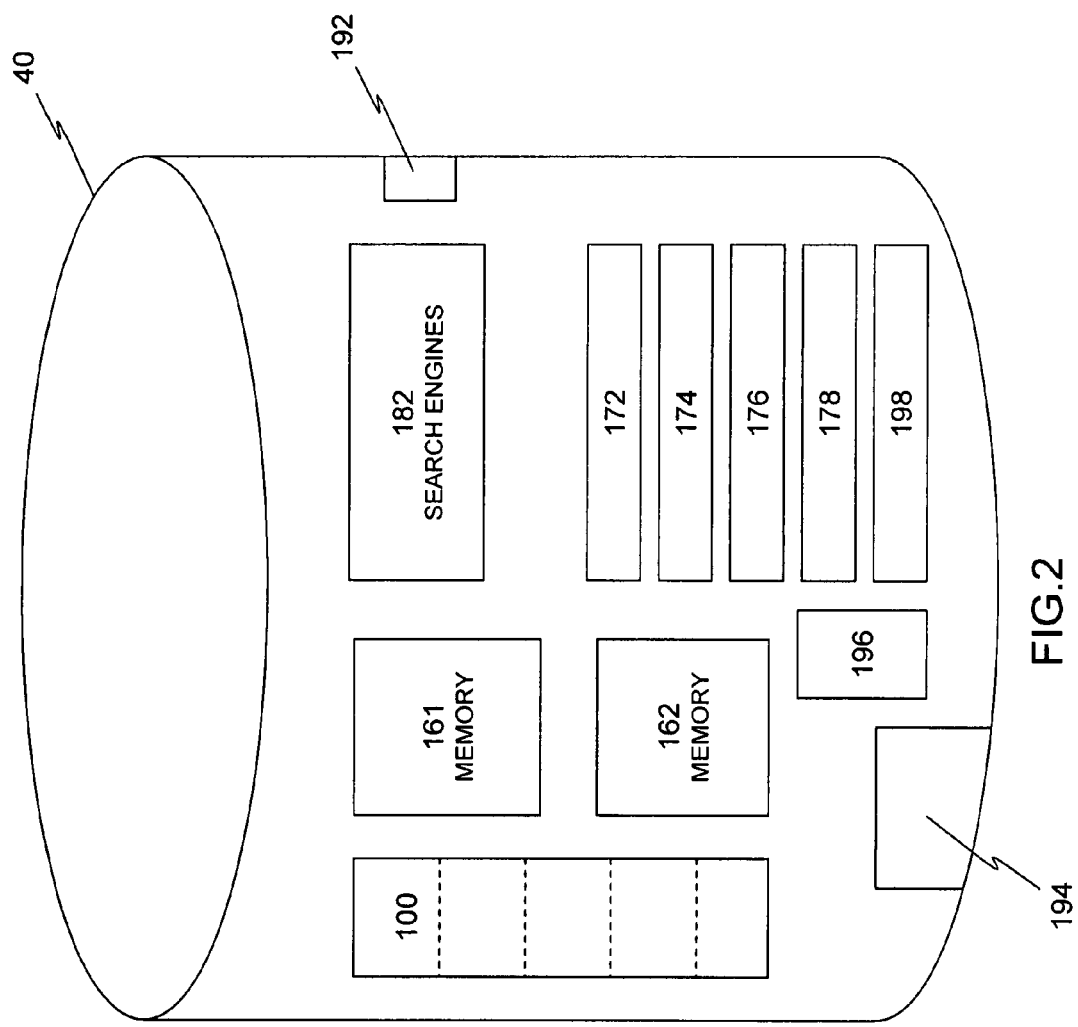
FIG. 2 is a block diagram of a central data processor according to one embodiment of the present invention.

One exemplary embodiment of central data processor 40 is illustrated in FIG. 2. In the present embodiment, central data processor 40 includes a data processing unit 100, a plurality of memory units 161, 162, a controller 196, and one or more communication ports. In addition, central data processor includes one or more search engine 182, visualization software unit 172, one or more relational databases 174, data formatting unit 178, host-specific information unit 178, and scenario building module 198.

Central data processor 40 is capable of also including one or more search engines 182 for retrieving links to or copies of the data documents 30a found as a result of a search request. Communication ports 192 allow central data processor 40 to connecting to remote document sets, such as possibly Internet or intranet sites, search engines, search web services, local or remote file systems, third party software applications or any other remote source of electronic data. Alternatively, central data processor 40 may use pre-programmed robots to retrieve data from specific sources, and to download the information to memory 161 or 162, where it will be accessible to search engine 182 as a document set. Inherent to the concept of the central data processor 40 are communication ports 194 for communicating to multiple host computers and networks and also a controller 196 for directing the flow of user requests and results.

Figure 4:
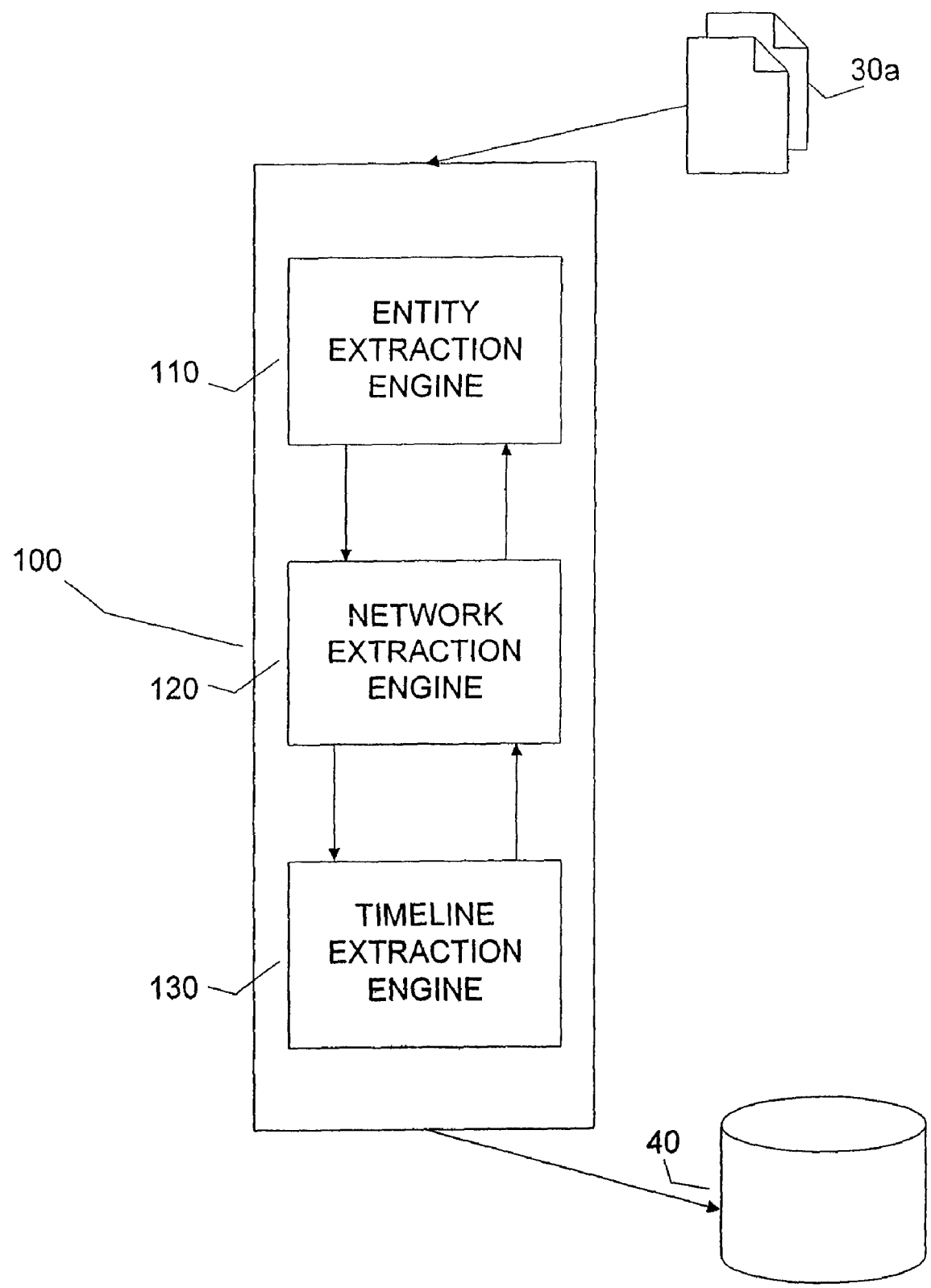
FIG. 4 illustrates a computing system configuration for extracting and processing data from a retrieved data document according to an exemplary embodiment of the present invention.

The central data processor 40 is configured to include software code to implement, for example, one or more of the data processing engines in the data processing unit 100, as illustrated in FIG. 4. The central data processor 40 is also configured to store the results of any one or more of the processing engines in a database, such as a relational database. The central data processor 40 may include, for example, vendor database software, e.g., SQLServer, MySQL and Oracle, or other types of database software. Additionally, the central data processor 40 may include the user interface software used by the user to access the one or more visualization models used to visualize the results of the data processing unit 100. The data stored in the central data processor 40 of FIG. 1 is, in one example, a representation or copy of one or more data documents 30a-1 . . . 30a-N, retrieved as a result of one or more data retrieval operations or searches performed by the user and/or automated search operations performed via the host computer 10 or the central data processor 40.

Memory unit 161, for example, may be used to store copies of retrieved data documents 30a, while memory unit 162 may be used to store results of applying the data processing unit 100 to the retrieved data documents 30a. Other elements of the central data processor 40 which are capable of being included within the plurality of memory units 161, 162 may include a user and host-specific information unit 178. For example, information unit 178 may be configured to store information relating to user passwords, user privileges, groups of users who share common privileges or licenses and operating statistics for host computers 10. One or more relational databases 174 may be incorporated to store the results of the data processing unit 100.

One of ordinary skill in the art will recognize that memory 161, memory 162, database 174, and information unit 178 may be implemented as distinct memory units or may alternatively be implemented as a single memory unit. In either case, any or all of said memory stores may be managed using relational database software such as Oracle, MySQL, SQLServer, in memory database(s), xml database(s), or using other memory management techniques known in the art. For simplicity, the remaining description will discuss an exemplary embodiment utilizing a relational database. A visualization software unit 172 for storing visualization software for either implementation on the central data processor 40 or for downloading to host computers 10 may be present to allow for graphical rendering of the data in the relational databases 174. A data formatting unit 176 may also be present for the formatting of processed data so that it is organized in a way that allows the visualization software to render the data.

Also shown in FIG. 2 is a scenario building module 198. Scenario building module 198, as described further below, may be utilized to model scenarios, i.e., possible sequences or combinations of events.

The functions performed by the central data processor 40 include, for example, performing searches, processing the retrieved search data via the data processing unit 100, storing the original data documents in a raw unstructured data format, searching the retrieved data documents, storing the processed data in a structured data format, executing visualization models based on the structured data, and generating scenarios arising from the processed data.

Figure 3:
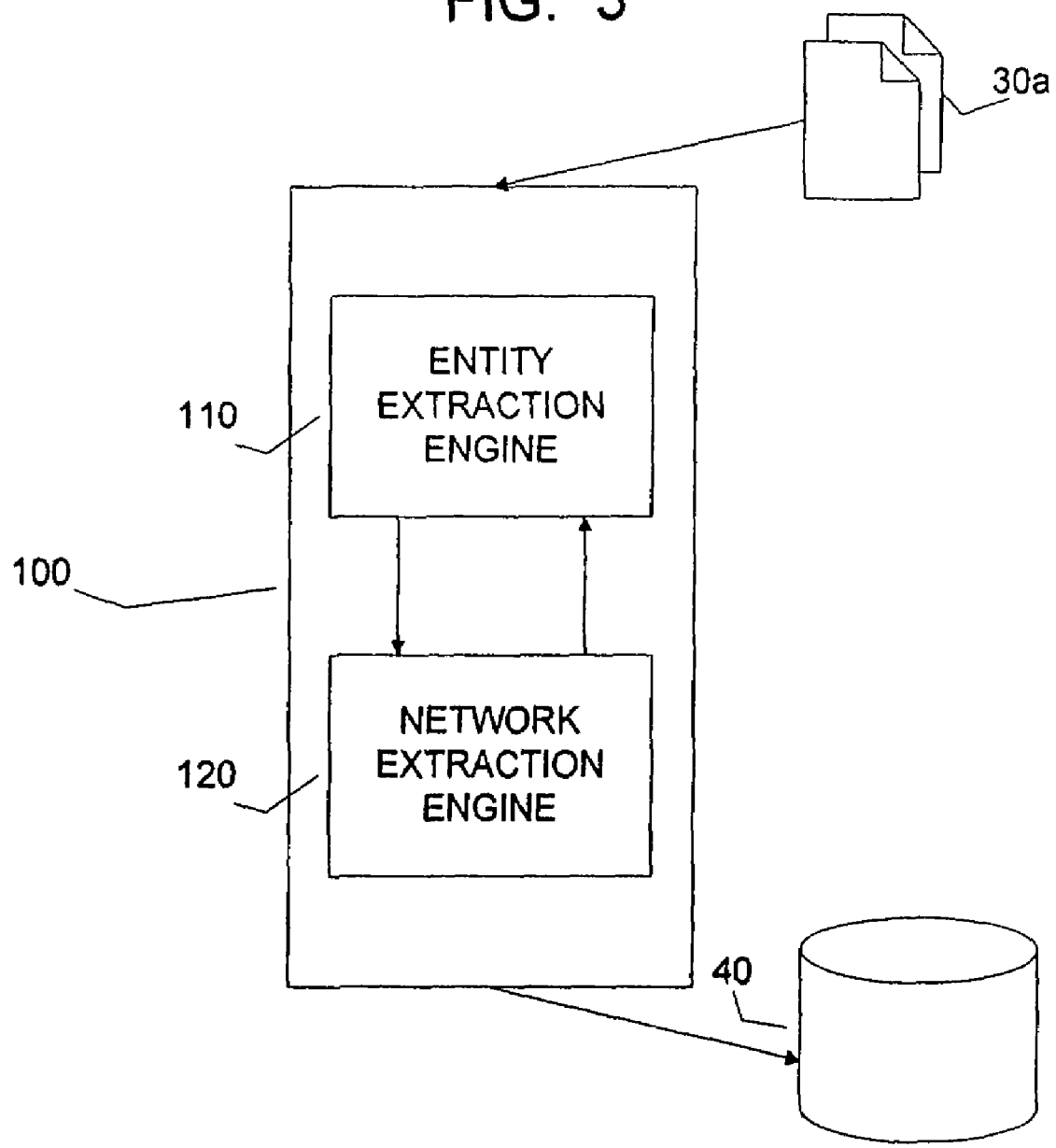
FIG. 3 illustrates a computing system configuration for extracting and processing data from a retrieved data document according to an exemplary embodiment of the present invention.
Figure 5:
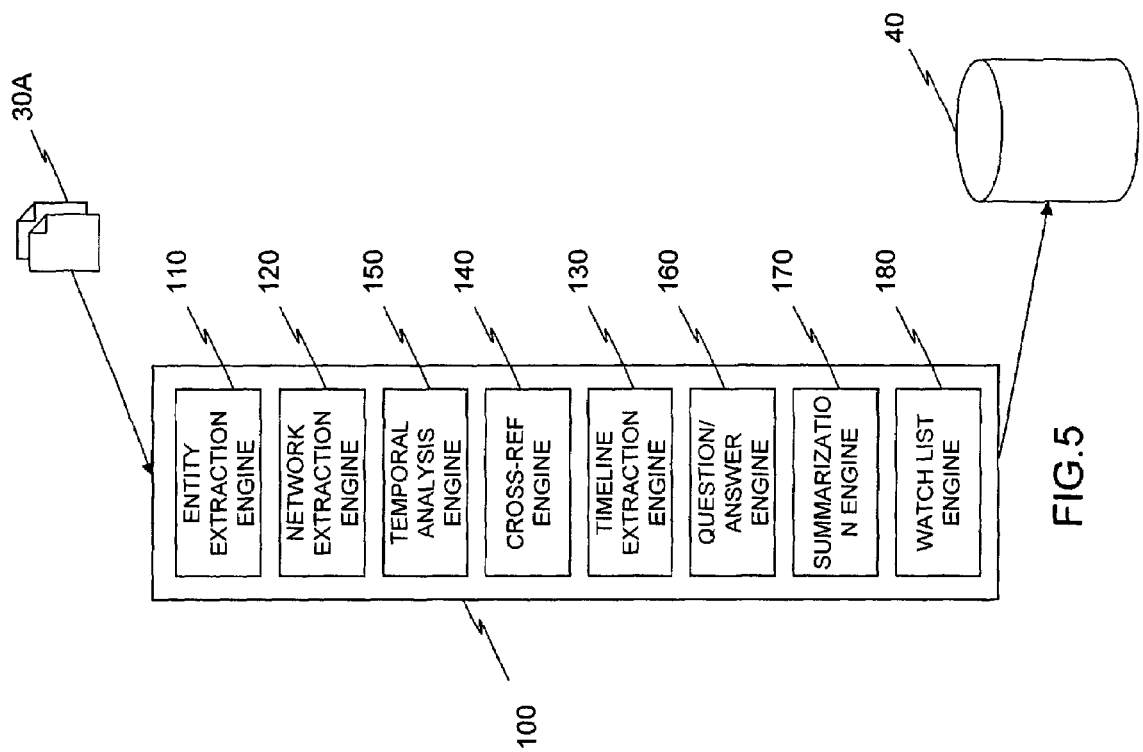
FIG. 5 illustrates a computing system configuration for extracting and processing data from a retrieved data document according to an exemplary embodiment of the present invention.

FIGS. 3-5 illustrate exemplary embodiments of data processing unit 100. Utilizing the system in accordance with the present invention, the user may request that data processing unit 100 process a document set utilizing one or more of the processing engines configured in the particular embodiment.

Referring to FIG. 3, an exemplary data processing unit 100 includes, for example, an entity extraction engine 110 and a network extraction engine 120, according to an exemplified embodiment of the present invention. In addition to entity extraction engine 110 and network extraction engine 120, the data processing unit 100 may contain other types of data processing engines, which will be described in further detail with respect to FIGS. 3-4. The entity extraction engine 110 and the network extraction engine 120 are used to extract data from the data documents 30a. The result of the one or more extraction operations performed may be stored inside the relational databases 174 of the central data processor 40.

Figure 6:
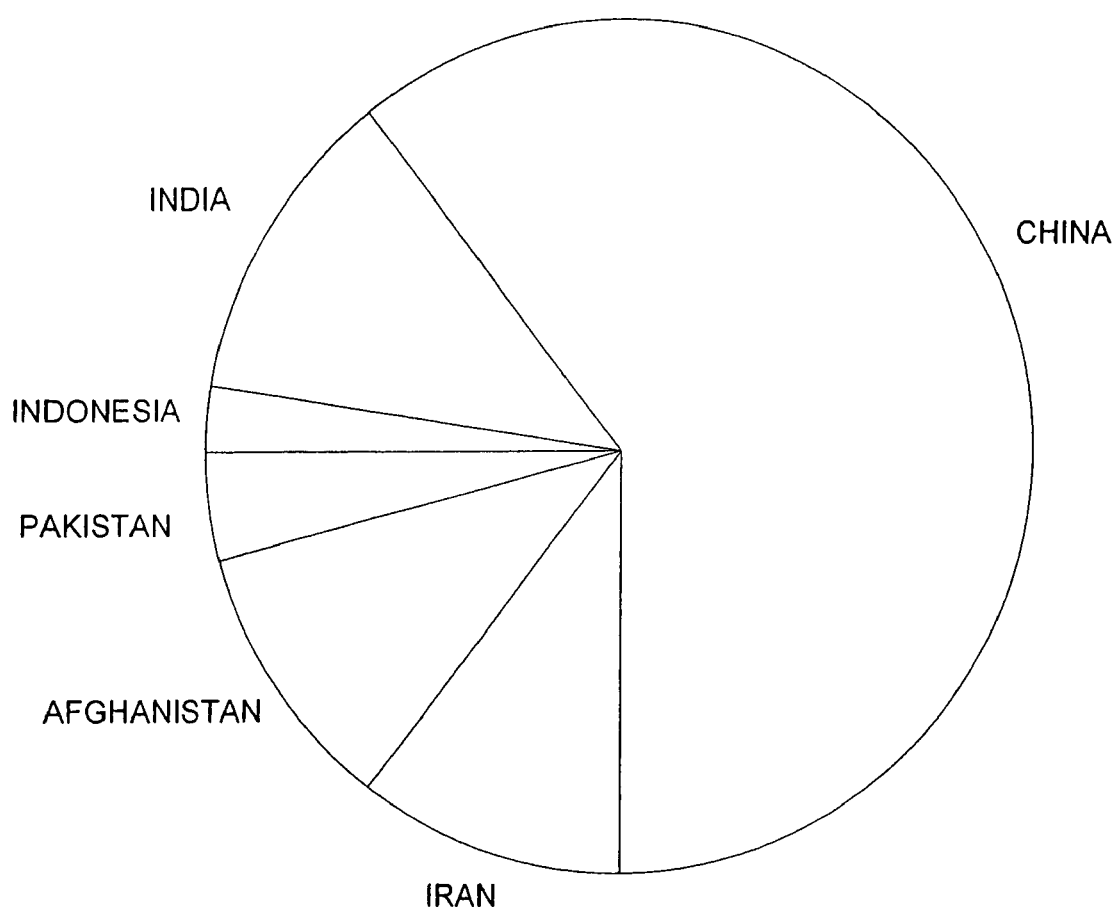
FIG. 6 illustrates an exemplary visualization format according to the present invention.
Figure 16:
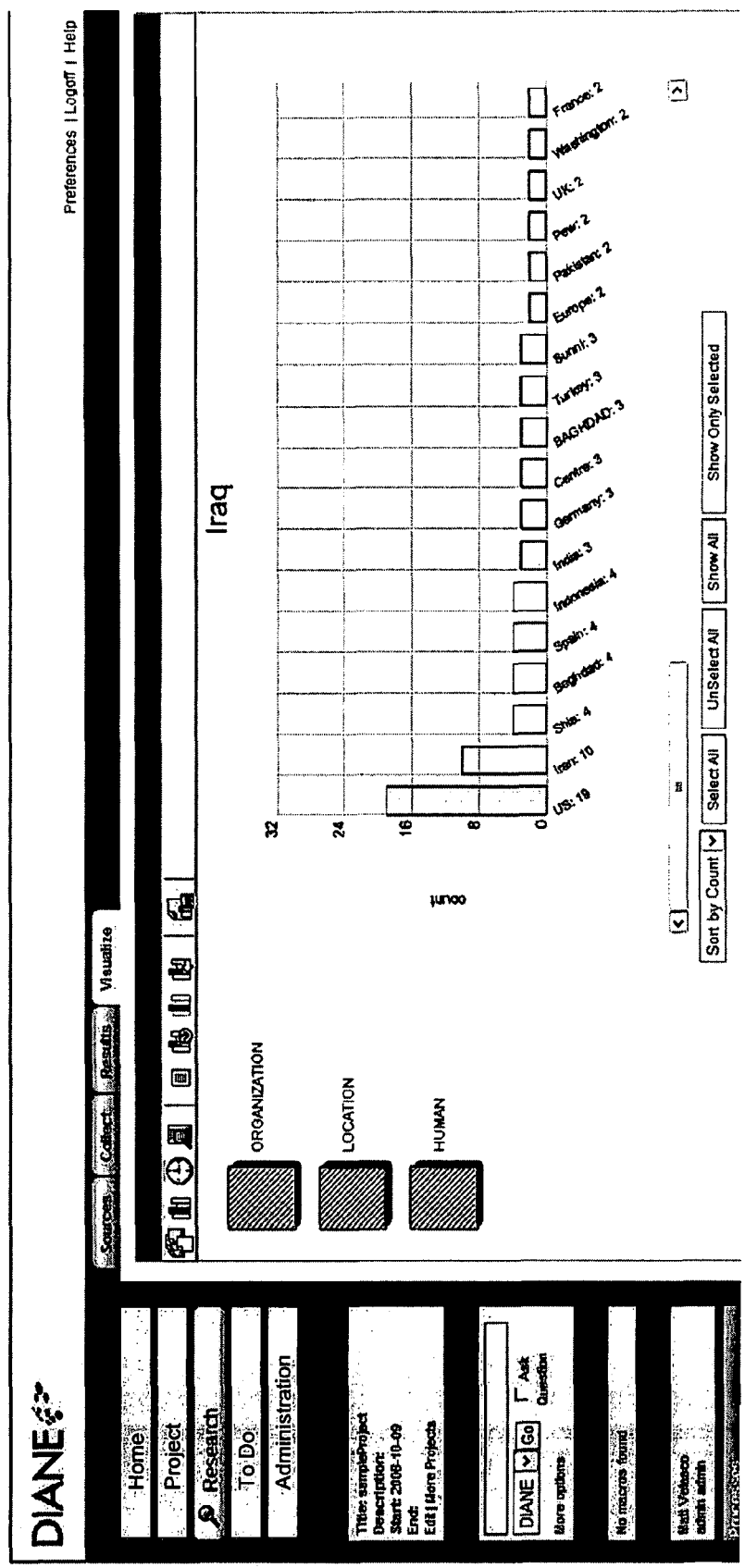
FIG. 16 illustrates an exemplary bar chart according to one embodiment of the present invention.
Figure 17:
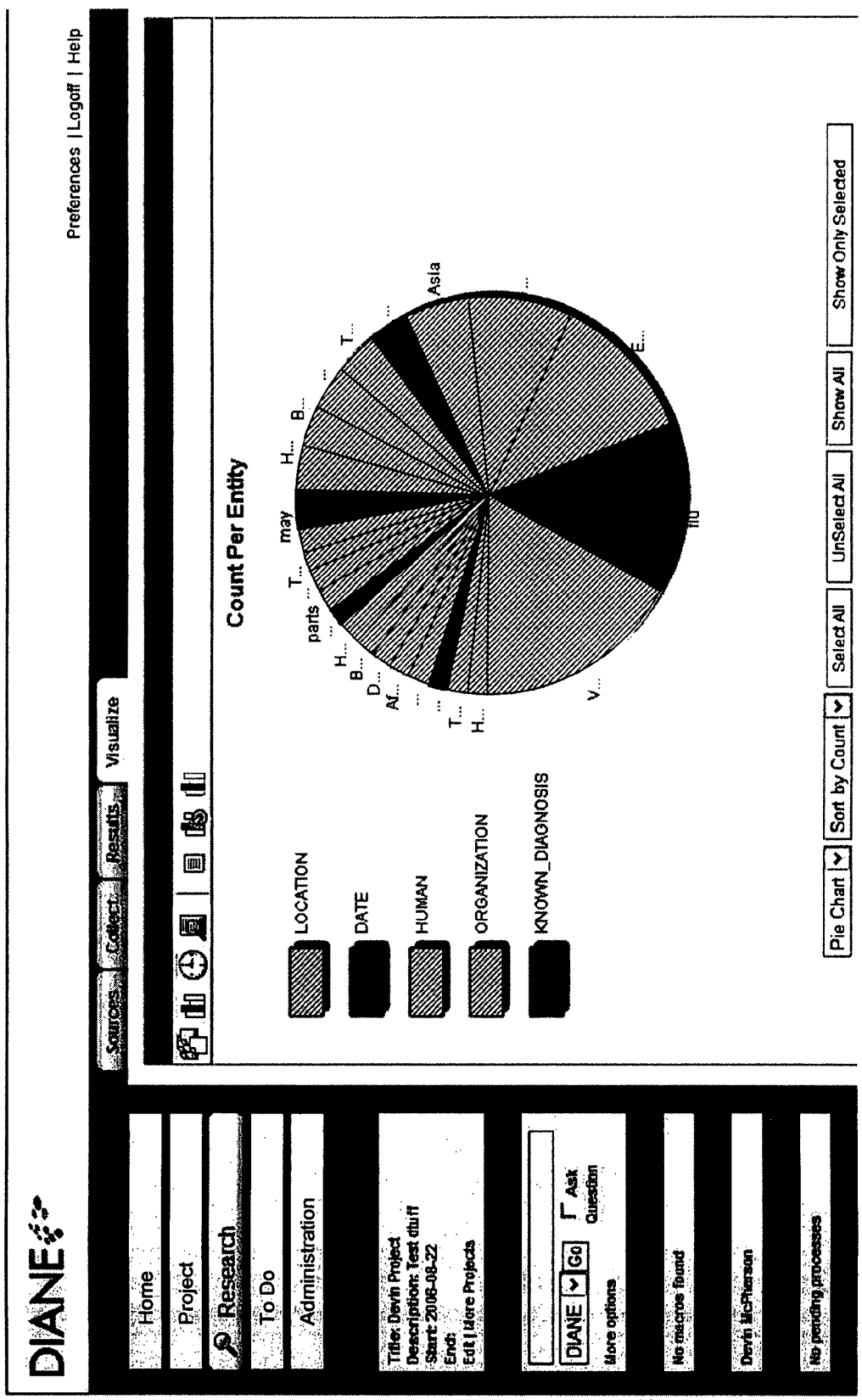
FIG. 17 illustrates an exemplary pie chart according to one embodiment of the present invention.

Once the entity extraction operation is performed, the identified entities are preferably displayed to the user, such as on GUI 5. Such visualization may take many forms, e.g., a chart, graph, timeline, relationship map, etc. Exemplary visualizations of extracted information are shown in FIGS. 6, 16 and 17. To accomplish this, the structured extracted data is communicated to the visualization unit 172, which provides the user with a visualization model containing one or more of the entities and their respective relationships (as explained below). Many techniques for rendering the visualization of the data are well known in the art and include utilization of such technologies as xsl transformations, HTML, DHTML, or scalable vector graphics (SVG).

The entity extraction engine 110 is capable of locating and/or extracting one or more entities, i.e., relevant nouns, magnitudes, numbers, or concepts contained within the text of the data documents 30a. The entity extraction engine 110 may utilize any number of natural or statistical language processors, separately or in combination, to determine the entities within the data documents 30a. An exemplary entity extraction engine 110 uses both NLP and statistical processors, such as the Bayesian theory processor explained above. The list of extracted entities may be structured using a markup language such as XML, to associate the extracted entity with additional information such as the data document from which it was extracted, the category of the entity (for example, "location", "person", "organization"), the date of extraction or other information. While the specific structure of the list may be dictated by a specific embodiment, it is preferable for performance reasons, that the structure contain the information necessary for visualization software unit 172 to render a graphical representation of the data. Alternatively, data formatting unit 176 may be employed to reformat the data into a format or structure usable by or required by visualization software unit 172 or another processing engine.

The processed data is stored in the relational database 174 of the central data processor 40. For this example, it is assumed that the original documents 30a have already been processed; however, if the same entity or entities appear again in subsequently processed documents, the common entities may be recognized by the entity extraction engine 110 as pre-existing entities. If however, a new entity is presented in a relationship with a pre-existing entity, then a new relationship may be drawn between the pre-existing entity and the new entity. For example, assume that a data document 30a contains the phrase "Mr. Smith goes to Washington." 'Mr. Smith' and 'Washington' are both entities that may be recognized by the entity extraction engine 110, and the relationship 'goes' may be recognized by the network extraction engine 120. Now, assume that a second data document 30a is processed that contains the phrase "Washington has 60% of the lawyers." The two documents share the entity 'Washington', and the new entity '60% of the lawyers' might lead a user to believe or infer that Mr. Smith might have some relationship with one or more lawyers.

The network extraction engine 120 operates in conjunction with the entity extraction engine 110 by identifying the relationships between entities in the document set. In one embodiment those entities may comprise the entities extracted by entity extraction engine 110, or may, alternatively be extracted by network extraction engine 120. The relationships may include, for example, indicators within a sentence or a portion of text that indicates that two or more entities share a relationship. The indicators may be linguistic terms identified by the NLP or statistical processor, or the indicators may alternatively be encoded links such as html hyperlinks. For example, assuming two entities are identified, the first being a person (e.g., Shakespeare) and the other a location (e.g., the Globe theater), and the sentence that describes these two entities includes one or more indicators in the text of the sentence that describes a relationship between the two entities, then the network extraction engine 120 may identify a relationship between the two entities and store that relationship by tagging the term or terms used to identify the relationship. In the sentence, for example, "Shakespeare's plays were performed at the Globe," the two entities "Shakespeare" and "the Globe" would, in one embodiment, be identified as having a relationship via the words "performed" or "at" or via the phrase "performed at." There may, in one embodiment, be an ontological basis for the relationship identification, such that, for example, 'works for' and 'employed by' carry the same semantic meaning, and can be recognized as being instances of a common concept.

Identified relationships are not limited to relationships indicated by linking words within a sentence. Relationships between entities are also identified where multiple entities are identified within a near proximity to each other, perhaps repeatedly, thus establishing an inference that a relationship does exist between the entities. Alternatively, the entity network engine may extract social or other types of networks such as by using algorithms known to those of ordinary skill in the art. The network extraction engine 120 will structure the results of its analysis, such as in an xml format, including, at a minimum, such information as the entities extracted, the relationships between those entities, and a label or description of that relationship taken or inferred from the text of the document.

Figure 7:
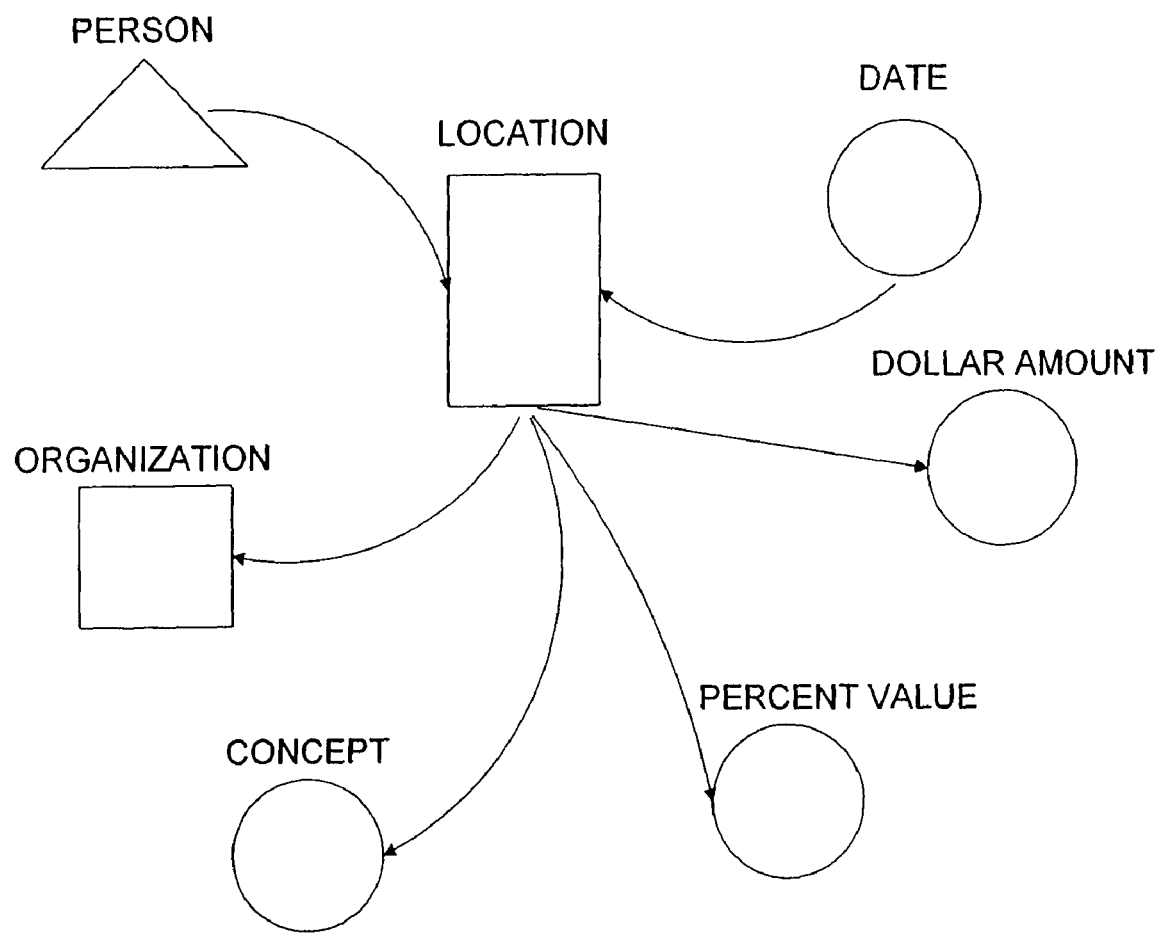
FIG. 7 illustrates an exemplary entity network visualization diagram according to one embodiment of the present invention.

The results of entity network engine 120 are preferably displayed to the user via an interface such as GUI 5. Exemplary visualizations are shown in FIGS. 7, 14a, 14b. Preferably, the visualization model displays to the user the entity, which may, in the exemplary embodiment shown in FIG. 7 comprise a person, location, date, dollar amount, organization, concept, or percent value. In addition, the visualization model should display links 700 indicating relationships between one or more entities, possibly including a direction or weight of the relationship. Such information may be extracted based upon whether the relationship was explicit or implicit, the active/passive tense of the verb indicating the relationship, the number of times or order of multiple co-references of the linked entities, or various other methods known in the art. In addition, the entity network visualization preferably displays to the user the description of the relationship, and allows the user to identify the document or document part from which the entities and/or relationships were extracted. Additional functionality associated with and incorporated into this visualization model are discussed below with reference to FIGS. 14a, 14b.

FIG. 3 illustrates an exemplary data processing unit 100 including the entity extraction engine 110 and the network extraction engine 120 of FIG. 2, and further includes a timeline extraction engine 130, according to another example embodiment of the present general inventive concept.

The timeline extraction engine 130 is used to identify events that one or more entities share in common. Timeline extraction engine 130 may utilize one or more of the entities extracted by the entity extraction engine 110 and parse the source documents from which the entities were extracted to identify events to which the entities were related. For example, the timeline extraction tool may parse each source document for each reference to an extracted entity, using natural language processing techniques for identifying whether that reference was accompanied by a temporal reference. In some cases, this may be explicit, such as in the sentence "On Jul. 4, 2005 Mike set off fireworks." Alternatively, a sentence may identify a relative time such as "last week" or "six months ago," which may be resolved using the published date (or other available date) of the document, or other metadata associated with the document. Timeline extraction tool 130 extracts each of these temporal references maintaining information such as the entity or entities involved, the significance of the time reference (i.e., what occurred at that time), the data document(s) from which the event was extracted, and possibly other information. This information is preferably represented in a structured format, such as by using XML, and may be stored in the relational database for future re-use.

Figure 8:
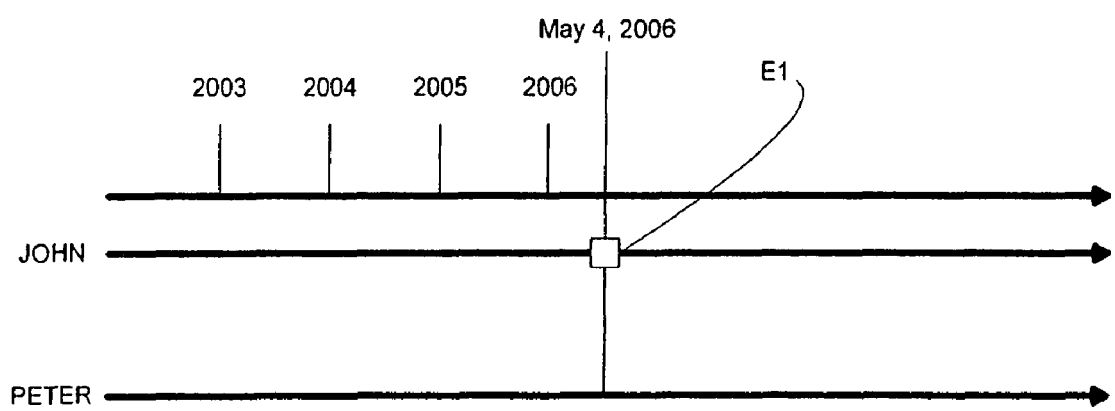
FIG. 8 illustrates a exemplary timeline visualization diagram according to one embodiment of the present invention.
Figure 11:
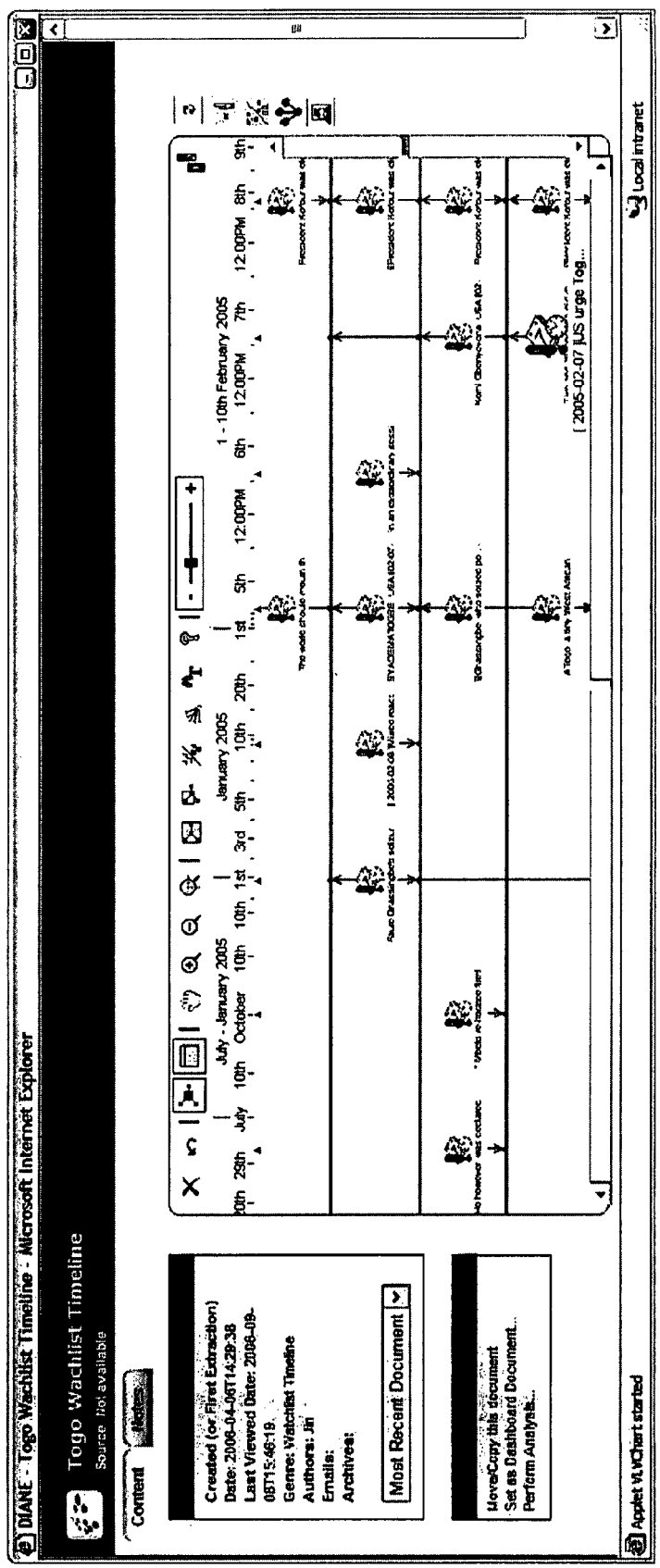
FIG. 11 illustrates an exemplary timeline visualization diagram according to one embodiment of the present invention.
Figure 12:
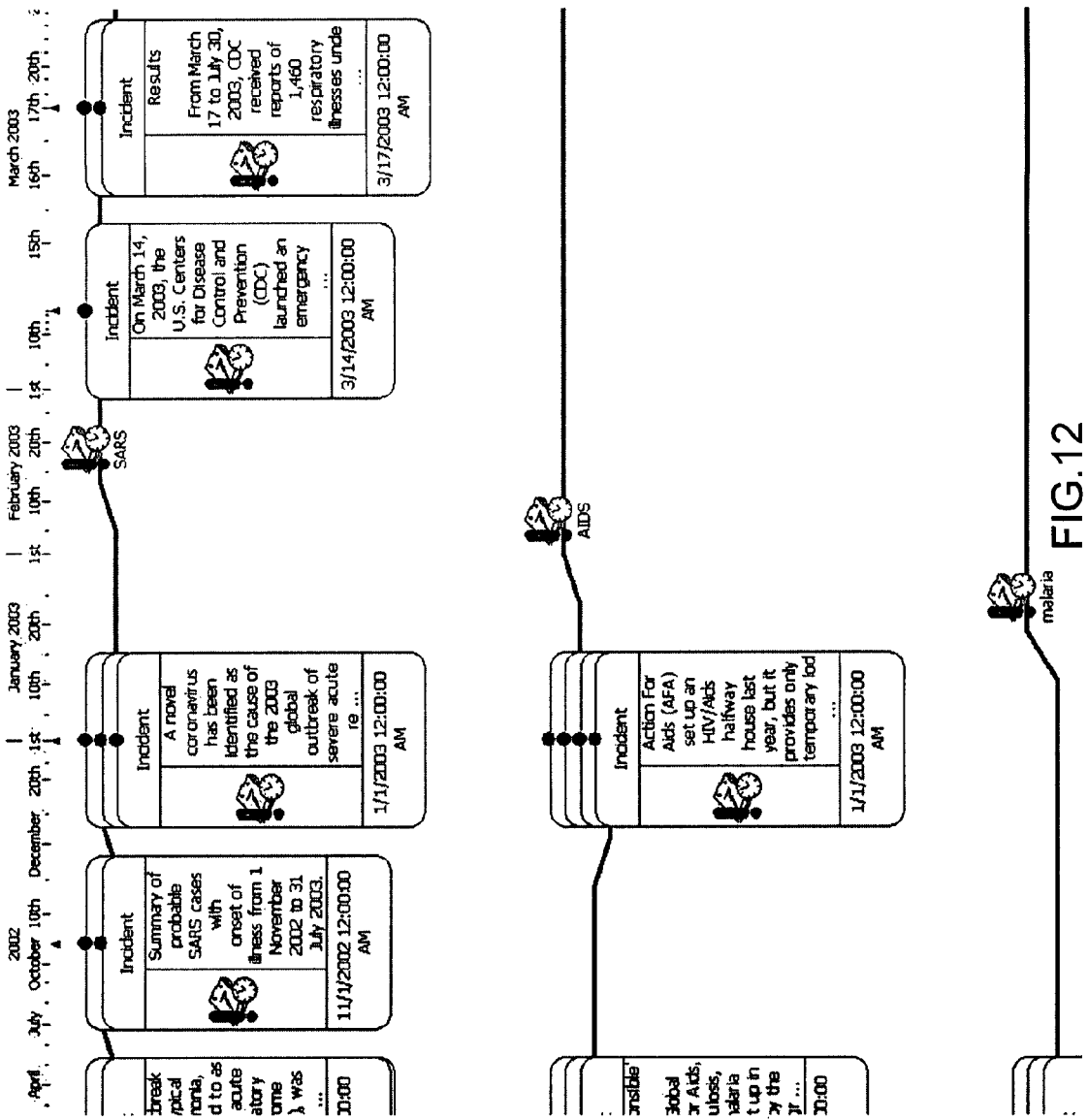
FIG. 12 illustrates an exemplary timeline visualization diagram according to one embodiment of the present invention.

Once the timeline extraction engine 130 has established one or more date(s) corresponding to one or more entities, a timeline visualization is used to illustrate the entities with respect to the dates. FIGS. 8, 11 and 12 illustrate exemplary visualizations of a Timeline. The visualization may include one or more entities ("JOHN" and "PETER" in FIG. 8). In addition, an indicator may be used to show a date that the two or more entities share in common. FIG. 8 illustrates a relationship between entities (also referred to in this context as "themes") 'John' and 'Peter' as sharing the date 'May 4, 2006,' meaning that some event happened on May 4, 2006 that both John and Peter have in common. An event is a specific item shared by both entities, and having some reference (implicit or explicit) to a specific time or time-frame at which the item occurred. For example, a 'meeting' that occurred on May 4, 2006 between 'John' and 'Peter' can be the event shared by both parties and indicated by box E1 in FIG. 8.

The timeline is capable of being included in a visualization model displayed to the user similar to the timeline illustrated in FIG. 8. The timeline can include one or multiple entities and one or more events associated with some or all of the one or more entities. In the above example, John and Peter share a meeting as an event. The line drawn through both entities connecting them together at the event box E1, as illustrated in FIG. 8, signifies that both entities share the same meeting as the event. In another example, the timeline may contain one or more events on a particular date that do not share a line drawn between two or more entities. In this example, an event may be denoted by placing a box at the intersection of the corresponding date and entity, however, no line or connection need be drawn to other entities contained in the timeline to illustrate that the event is not shared by more than one entity. FIG. 11 shows another exemplary representation of a timeline. In FIG. 11, events relating to a specific entity are shown with arrows indicating which entity is involved with each event. Some events relate to more than one entity. FIG. 12 shows another exemplary representation of a timeline, in this instance, a zoomed-in view of a timeline where each event is described in detail. The timeline provides a useful visualization model to realize dates and corresponding relationships between entities extracted from the data documents 30a.

In one embodiment, the visualization model is also capable of displaying, to the user, the document, or a subset of the document, from which the event was extracted. In addition, in one embodiment, the data used to create the timeline visualization may be used to display the same timeline data in an entity network format, such as to display a quasi-social network. For example, the entities "John" and "Peter" (see FIG. 8) may be displayed as entities in an entity network with the relationship interconnecting them being represented by event E1.

The exemplary data processing unit 100 illustrated in FIG. 5 includes an entity extraction engine 110, a network extraction engine 120, a temporal analysis engine 150, a cross-reference engine 140, a timeline extraction engine 130, a question/answer engine 160, a summarization engine 170 and a watch list engine 180. Any one or more of these engines, individually or combined, is capable of being used to process the retrieved data and provide the user with a visualization model of the data pertinent to the user's search criteria.

FIG. 5 illustrates a combination of engines including the entity extraction engine 110, the network extraction engine 120, the temporal analysis engine 150, the cross-reference engine 140, the timeline extraction engine 130, the question/answer engine 160, the summarization engine 170 and the watchlist engine 180, according to an example embodiment of the present general inventive concept. The data processing unit 100 houses the data processing engines and is used to realize data contained in one or more data documents 30a stored in the central data processor 40.

The temporal analysis engine 150 is an example of a type of data extraction engine that is used to realize data, according to an embodiment of the present invention. The temporal engine 150 is a specialized entity extraction engine used to provide a user with a type of data visualization model that shows references to an entity as a function of time, also referred to as information velocity. The temporal analysis engine 150 may be used to provide a user with a type of data visualization model that charts the number of occurrences or a magnitude value of occurrences of a particular entity per date. For example, the user may wish to know the number of times an entity or entities were referenced over a period of time in the data available to the system. In this case, the entities may be extracted from the source documents using an entity extraction engine, and plotted as a function of time, such as by reference to the publication date of the data document from which the entity was extracted. Such information may be displayed to the user using a heat-map, such as in the example shown in FIG. 18, and described below. The temporal engine 150 should be capable of being used by itself as a sole processing operation or in combination with any one or more of the other processing engines 110, 120, 130, 140, 160, 170, 180.

The cross-reference engine 140 is another example of a type of data extraction engine that is used to realize data, according to an example embodiment of the present invention. The cross-reference engine 140 is used to provide a user with a type of data visualization model that charts the number of occurrences of other entities mentioned in the same data document or context as a constant entity. For example, the user may have performed an entity extraction analysis on a set of documents, and identified that "Iraq" was mentioned in those documents. If "Iraq" was important to the user, the user may wish to see what other entities from the chart were mentioned, and with what frequency, in the documents or contexts from which "Iraq" was extracted. The cross-reference engine 140 could thus be used to hold Iraq constant by identifying the documents from which it was extracted, and performing an entity analysis on those documents. An example of a visualization of cross-sectional results is shown in FIG. 16, which will be discussed further below. The cross-reference engine 140 may be used by itself as a sole processing operation or in combination with any one or more of the other processing engines 110, 120, 130, 150, 160, 170, 180.

The question/answer engine 160 is a type of analysis tool that provides answers to a user's question using data documents 30a (FIG. 10). For performance reasons it mat be preferable for the question/answer engine 160 to automate a search of the data documents 30a directly by searching for keywords included within the user's question, such as to limit the set of documents sent to the question/answer service. Alternative, the user may be able to identify a set of documents to be used as the collection against which the question/answer engine may perform its analysis. Additionally, the question/answer engine 160 may be capable of searching the terms extracted by the entity extraction engine 110. Once the data documents are identified, the question/answer engine utilizes language processing techniques to identify a phrase, sentence, paragraph or other unit of text from the returned documents that most closely responds to the posed question. In addition to returning to the user a list of relevant documents, the question/answer engine 160 also returns a portion of text (if available) from each returned data document to show the user the phrases in the data document that most apply to the user's question. An exemplary screenshot of one embodiment of the results of question/answer engine is shown in FIG. 10. Thus, the question/answer engine 160 may be used as a stand-alone engine or in combination with any one or more of the other processing engines 110, 120, 130, 150, 170, 180.

The summarization engine 170 is used to obtain the most relevant sentences of a user-selected data document (or documents) without the need for a user to actually read or otherwise analyze each data document. Given relevant data documents 30a, a user can select some or all of the retrieved data documents for automated summarization. The user determines the type and extent of the summaries to be returned by the summarization engine 170. For example, the user indicates whether summaries should be returned as a certain number of sentences extracted from the data document, or a certain number of words, or even a number of characters of the summarized document. Upon execution, the summarization engine 170 determines the requested number of sentences, words or percentage of each data document that best represents the entire data document. This is done by first identifying keywords, concepts and concept relations from the data document using linguistics and statistical analysis.

The identified terms are then used to select key sentences from the document, enforcing various predetermined requirements regarding the scope and coherence of the identified terms. Many algorithms known in the art may be used. For example, one summarization algorithm involves identifying logical form triples, subject-predicate-object, for each sentence in the document, and then graphing the results in a semantic graph to identify the most common triples. Other algorithms are also used. Once summaries of each requested document are returned, the user is in a position to determine which of the selected documents are most relevant and should be further processed using the other processing engines.

The watch list engine 180 is used to filter entity extraction results for further analysis. The watch list engine 180 uses a user-created watch list, or a list of terms of interest (an accompanying synonyms), in order to filter the entity extraction results. The user-defined watch lists are used by other processing engines in order to process only the selected terms or entities from the watch list in the data documents. A watch list may be used by the entity extraction engine 110, the network extraction engine 120, the timeline extraction engine 130, the search engine, or any other processing engine, as a way to limit either the input or the output of the engine. For example, the watch list engine 180 only extracts user-defined entities, terms or phrases. Generally, either through experience or after some initial analysis of data documents, a user creates a watch list, a list of terms upon which the user desires to concentrate further searching, retrieval and processing operations. In addition, a watch list may include synonyms or A.K.A.'s for individual watch list terms. As will be described below, the watch list may be modified or added to by additional allowed users so as to be fully inclusive of the collective knowledge and experience of all allowed users. The watch list engine 180 is especially effective when combined with the monitors and macro features described above. For example, a macro may be created that instructs the central data processor 40 to execute one or more monitors using only the terms defined in a watch list.

The data processing engines 110-180, as shown in FIGS. 3-5, may either be integrated such that they operate "on the fly", i.e., when requested by a user input, or may be integrated such that they run according to a schedule. Generally, those data processing engines 110-180 that require a longer period of time to process data are used according to a scheduled process (i.e., the time-intensive processes are run during off-peak times). On the other hand, those data processing engines 110-180 that are performed quickly are often done "on the fly." For example, the entity extraction engine 110, the network extraction engine 120, the timeline extraction engine 130 and the watchlist engine 180 are all examples of engines that may be run according to a scheduled process. These engines are monitors, processing engines that result in a visualization of the data contained in the processed data documents. Monitors may be incorporated into macros; a sequence of instructions that are programmed and scheduled to run and that includes one or more monitors.

The data processing described above, as well as the visualization operations, are implemented by installing the data processing unit 100 into a central data processor 40 and a browser or other user interface onto a user's host computer. The browser or other user interface is configured to allow access to the data processing unit 100 in the central data processor 40. The browser or other user interface is also configured to render a plurality of visualization models on the data output by the data processing unit 100. Although it is possible that a user could download a specific data processing unit 100 for installation on the user's host computer 10, it is preferred that the data processing unit 100 remains on the central data processor 40. In this way, updates to the existing data processing unit 100 are made or even a new data processing unit 100 or analysis module is added to a central location (the central data processor 40) without the need for updating each host computer 10.

The central data processor 40 provides a source of data that the user accesses through the web browser interface or GUI 5. In general, the web browser interface or GUI 5 is installed on, or communicated to, the host computer 10 to enable a user to interact with the operations provided by the central data processor 40. Such interface may take the form of either a rich client, in which a software application resident on the host computer includes instructions for displaying and processing data provided by central data processor 40, or may be a thin-client, such as an Internet browser, which simply renders display information containing the results of processing executed by central data processor 40.

For example, a user may request a search of a certain data repository. By using the web browser interface on host computer 10, the user instructs the central data processor 40 to search the specified location for data pertaining to the user's search terms. Once the user has entered the search criteria, the central data processor 40 performs various operations in an effort to retrieve data responsive to the user's request. As previously stated, the central data processor 40 can use the network 20 (FIG. 1) to search remote data locations for the user's requested data, or may search a local repository of data previously retrieved from network 20. Once the data is retrieved, the central data processor 40 communicates a representation of the data to the display. The user may select one or more data documents from the retrieved data documents 30a to be processed and optionally stored in the relational databases 174. The processing may include entity extraction and network extraction processes (as explained below) to discover the entities contained in the one or more data documents 30a retrieved.

A commercial search engine, for example, operates in a similar manner by retrieving data from the Internet, computing and storing an index on the retrieved data in a data repository or relational database. When a user performs a search via a commercial search engine, the data repository of the commercial search engine will be searched for relevant data to return to the user based on the content previously extracted from web sources that were discovered on the Internet by the search engine. The data stored in the commercial search engine data repository may be structured to allow for easy access upon a future user request to retrieve data.

Similar to the commercial search engine, the search engine 182 may be capable of structuring data retrieved from the Internet and/or other data sources. For example, search engine 182 may be accompanied by a data retrieval module (not shown), which may collect data for storage in a local repository. Search engine 182 may then process the stored information, such as by indexing it, for easier retrieval.

The data retrieval process may be performed by "robots," which access data from remote databases and other data sources over the Internet. A robot may be used to gather data from a particular website and return that data to a relational database or other data store. Robots are useful to collect large amounts of structured, unstructured and/or semi-structured data in an automated manner. The robots are used to search a particular website or a uniform resource locator (URL) destination for documents pertaining to predetermined criteria, and are configured to be scheduled to perform searching operations at regular intervals. Other data collection techniques are well known in the art and may be substituted within the spirit of the present invention, such as spiders or web crawlers, which are not targeted and programmed for a specific web site.

The central data processor 40, however, is more than just a search engine for at least the reason that the central data processor 40 can perform language processing via NLPs and statistical language processors in addition to data structuring to create a structured set of data based on the retrieved structured, unstructured and/or semi-structured data.

A schema is used as a structured data format to store the structured data in the relational databases 174. A schema is a way of structuring the data to provide a connection between the retrieved and processed data and the software application tools used by the user. An example schema might include a tabulation set of processed data organized by a category type. For example, a set of data values or numbers that relate to entities of interest to a user are organized into a first structure designated for numbers. The numbers are given a corresponding variable name and value that the software code understands so that the numbers may be referenced by a user operation to visualize the entities using one or more visualization models. The schema corresponding to the applications described herein are custom designed to correlate to the particular applications offered to the user and/or based on a pre-existing schema. Schemas are commonly used in database programming, and are well known to one of ordinary skill in the art.

The data stored in the central data processor 40 are, for example, in data documents 30a which may include more than one document containing unstructured and/or semi-structured data. The data documents 30a may include text, images, sound and/or video. For purposes related to this example, it is assumed that the data documents 30a contain only text. Generally, a user will perform a search which results in a list of one or more data documents 30a containing entities relevant to the user's search request. As an example, FIG. 11 shows a list of relevant documents found during a search for avian bird flu. The user may select one or more of the returned data documents 30a for processing. The documents are processed from their location within the remote network 20, from their location in the local data repository, or are alternatively copied into a memory of the central data processor 40 for further processing. The data documents 30a are processed by the data processing unit 100, which is located inside of the central data processor 40.

For example, the user may desire to search for news on a particular subject by using predetermined search terms (e.g., "global", "epidemic" and "disease"). The user may also limit the search to specific data sources (e.g., specific web sites). Once the search is requested, a search engine is used to execute the search by seeking for search results within a network or networks 20 or from the specified data sources. Network 20 may, alternatively, include the Internet. Upon execution of the search, the search engine returns a list of one or more relevant data documents 30a to the user at host computer 10. The list of relevant documents is capable of being stored in a central data processor 40. From the representation of the search results, the user may select a subset of the relevant documents 30a to be copied for storage in the central data processor 40. Alternatively, central data processor 40 may have pre-fetched the data documents from the network, storing a representation of them. In such a case, central data processor 40 might have searched its local repository returning a representation of the relevant subset of the data. The data returned to the user is also capable of being stored in a different memory source such as a temporary memory source separate from a main memory hard disk. The separate memory source is a more economical and efficient way to provide the user with a visualization model and/or search result information.

The user may desire to repeat the search in order to update the search results. In order to do this, the user again conducts a search using a search engine or the user uses a robot to retrieve desired data documents from specific data sources. For example, if the user is seeking information relating to a global epidemic, the user may determine that relevant information is periodically available at the health page of a major new web site. Instead of manually checking the site on a regular basis, the user can instead conduct a search to see if information from the site appears in the search results. Alternatively, the user uses a robot that is programmed to periodically fetch the specified health page of the news site and copy the specified page onto the central data server 40. Then, the copied page is searched according to the predetermined search terms.

Alternatively, a scheduled search may include commands to search particular URLs by initiating searches having predetermined search criteria. For example, the initial searching operation may have included the search terms "terrorism" and "bombings", and may have yielded many relevant results from a website or URL known for news on terrorism bombings. If the results of the search were useful in assisting a user with noting trends among recent terrorism attacks, then the scheduled search feature is invoked to perform repeated searches using similar search terms at a later scheduled time.

The scheduled search feature may be implemented as a macro. A macro is a set of user-defined instructions that, when executed, repeat sequence(s) of instructions or capabilities. A macro can include more than just search instructions. A macro can include any sequence of instructions, including, but not limited to, searching and updating documents and processing data in documents, or any other instruction accessible to the user of the system.

The data that is discovered as a result of these additional search efforts is further processed via the same methodology employed on the originally processed data. Alternatively, the new data may be processed in an expedited manner that does not perform all of the tagging, structuring and storing operations previously described. For example, the system may allow a user to automate the process of selecting a subset of the search results to send to an analysis engine, such as the entity extraction engine, identify those documents that contain references to a specific entity or set of entities, send that subset of documents to another visualization, for example the timeline engine, and store the results in the relational database. One commonly used technique for automating such as process is to create or record a macro, which will be described in more detail below. Therefore, the data in the user's visualization model may be displayed containing the previously processed data, or, the user may desire to have the updated information incorporated into the existing visualization model ad hoc, and in a timely manner. The user may have the new data processed to discover any relevant pieces of information, e.g., new entities and relationships or other types of relevant data. Once the new data is found to contain relevant data overlapping with one or more pieces of data in the original visualization model, the data may then stored in the relational database, and/or displayed to the user with the original data. The new data may be automatically incorporated into the visualization model or may be incorporated upon an explicit request.

The new data may be displayed in a manner that is easier to recognize the change that has taken place since the first visualization model. For example, a new entity may be illustrated as being bold, or highlighted to indicate that it is new to the visualization model. Other examples include a relationship being illustrated in a different color to indicate that the relationship did not exist in the prior visualization model. It must be appreciated that other examples of incorporating updated information into the visualization models which are not described herein but which are within the scope of the general inventive concept are also included. One will recognize that the user may create the macro to incorporate whichever step(s) and/or visualizations are most useful to the user. In this way the macro can be used to free the user from manually repeating processes of gathering and performing initial processing of documents, and instead allowing the user to focus on the results of the initial processing and to identify the new data that may be particularly relevant to the user's end goal or need.

Figure 9:
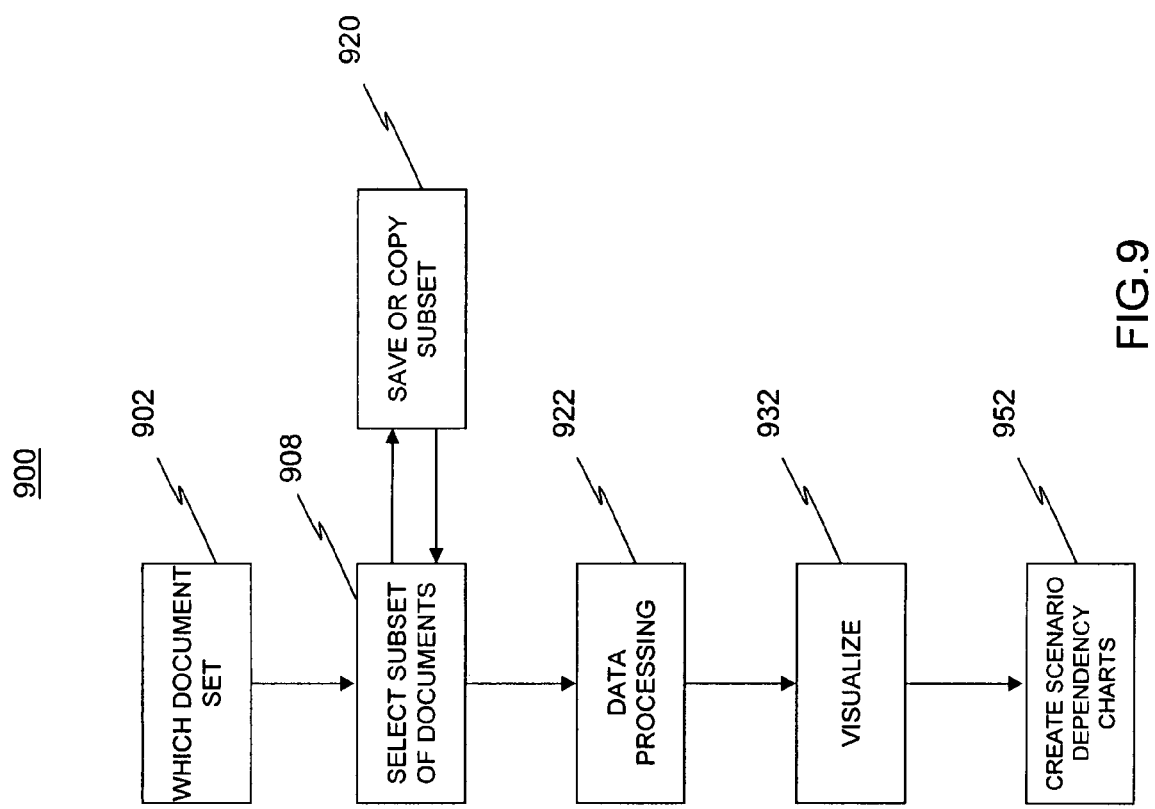
FIG. 9 is a flow diagram that illustrates an example embodiment of the present invention.

A user may utilize the system of the present invention utilizing a method such as the method described by the flowchart in FIG. 9. Such a method may be performed by inputting selections using the input tools associated with computer 10, in response to input cues, prompts, or other form presentation on the GUI 5.

Initially, the user collects information in the methods described above and as shown in flowchart 900 of FIG. 9. In step 902, the user determines which document set(s) to analyze. As described above, the document sets available to the system may include any number of electronic documents at locations in electronic communication with central processing unit 40.

In particular, it is envisioned that central data processor 40 may be programmed to periodically retrieve documents. In one embodiment, the user may have accessible only data that resides in memory unit 161. Such data may have been uploaded to the system by the user, either individually or in a batch, or may have been retrieved from external sources via a scheduled process such as a spider or robot. For example, if a website URL or data source has been identified as a potential source of data, or alternatively incorporate a robot, spider, web crawler, or data scraping technique (many of which are well known in the art) on that data source to incorporate its data into the accessible data store. A user benefits by the updated data, especially, if the user's needs require frequent updating to determine if any changes in the pre-existing data have occurred. Alternatively, the central data processor 40 is capable of performing repeated search operations over intervals of time (for example, every second, minute, hour, day, week and/or month, etc.) in an effort to retrieve new documents or documents that are up to date. This automated process may be performed via a user initiated schedule or under a predetermined schedule.

Within memory unit 161, the data documents may have been organized into a project or folder structure for easier navigation, analysis, browsing or other purposes. In such a case the contents of any project, folder or group thereof, may constitute a document set usable within method 900.

Alternatively, the document set may consist of documents returned via a search. Via GUI 5, the user may select one or more document sets to search, identifies search terms, and possibly other search criteria, such as advance search fields (i.e., search for a document date, genre, author, etc.), or type of search (such as boolean, concept, or keyword search). The user submits the search terms to the central data processor 40 by inputting the search terms through a user interface or browser installed on the user's host computer. Central data processor 40 executes the desired search (NOT SHOWN) and returns a list of relevant data documents 30a to the user, for example in a visualization such as is shown in FIG. 10. Such a search may comprise communication to an Internet search engine or webs service, such as Google™, or may utilize locally or network installed search software such as Convera's RetrievalWare™.

In step 908, the user selects a subset of the returned data documents 30a for data processing. Optionally, the user may identify a subset of the document set to be saved or copied into an existing or new project or folder for use in iterations of process 900, step 920. A user at a host computer 10 (FIG. 1) may indicate through the installed web browser or GUI 5 that one or more of the analysis engines 110-180 should be executed on a specified subset of the data documents returned as a result of the user-defined search, step 922. The user can select from any available language processor installed on the central data processor 40 and as allowed by the host-specific information unit 178 (FIG. 2). Once the entities are extracted, the original contents of the data documents 30a may be stored inside the central data processor 40 (such as in memory 161) without modifications thereto, if they have not already.

The subset of documents may be selected after a review of the returned data documents where the review includes reading one or more of the documents, reading the summary of one or more of the documents or, preferably, the user may utilize one or of the analysis engines to identify the documents that may, for example, identify a combination of entities. For example, using entity extraction tool 110 the user may identify the documents that mention each of "Afghanistan," "Osama bin Laden," and "Iraq." That subset of documents may be sent to other analytic engines 110-180. One of ordinary skill will realize that, depending on the need of the user, the analytic tools 110-180 may be utilized in any order to achieve certain insights into the data set, without the need to read carefully all documents in the set.

In step 922, the user chooses to process the subject document set using the data processing unit 100 that is installed on the central data processor 40 and available within the browser of the user's host computer 10. For example, the user is able to choose to process the selected data documents with the entity extraction engine 110, network extraction engine 120, or another analysis engine such as those identified in FIGS. 3 and 4. The user is also able to choose to apply the temporal analysis engine 150, the cross-reference engine 140 and the timeline extraction engine 130. The question/answer engine 160 and the summarization engine 170 are also available for use. The results of the data processing may optionally be stored on the central data processor 40, such as for efficient re-use of the data or to prevent the need for future re-analysis by the analytic tool.

Whether stored in memory or not, the results of the analytic tools are preferably presented to the user through the browser or GUI 5 on the host computer 10. The user is able to view the processed data through any number of the visualization means identified herein. Preferably, as described further below, each visualization incorporates the ability to identify one or more of the documents that produced some or all of the visualized results, and select those documents such as to comprise a document set for an iteration of process 900. The visualization means include, but are not limited to, entity pie and bar charts, entity network maps, influence charts, timeline charts and heat-maps.

Furthermore, the visualization may be created as the result of a user selection of an analysis tool. For example, as noted above, the visualization tools are capable of being configured to run at user selection or on a pre-defined schedule (i.e., as a monitor). Step 932, in one embodiment includes the user selection of a analytic tool for creation of the visualization on the fly. Alternatively, as the user identifies and pares the document set, and or modifies the contents of a project or folder, one or more of the analytic tools may be scheduled to run on the contents of the document set, project or folder, such as to identify the changes in the data set.

As previously noted, method 900 is, in one embodiment, a method intended to be repeated to allow for further refining of the document set. In one embodiment the user may input selections at a visualization or on search results, for example, and identify those documents for sending to a visualization tool, thus manually repeating the process. Alternatively, the user may build or record a macro to automate the tasks. At the same time, macros may be used, thus allowing any one or more of steps 902, 908, 922, and 932 to be repeated automatically according to the sequence laid out in the user-defined macro (step 942).

Figure 15:
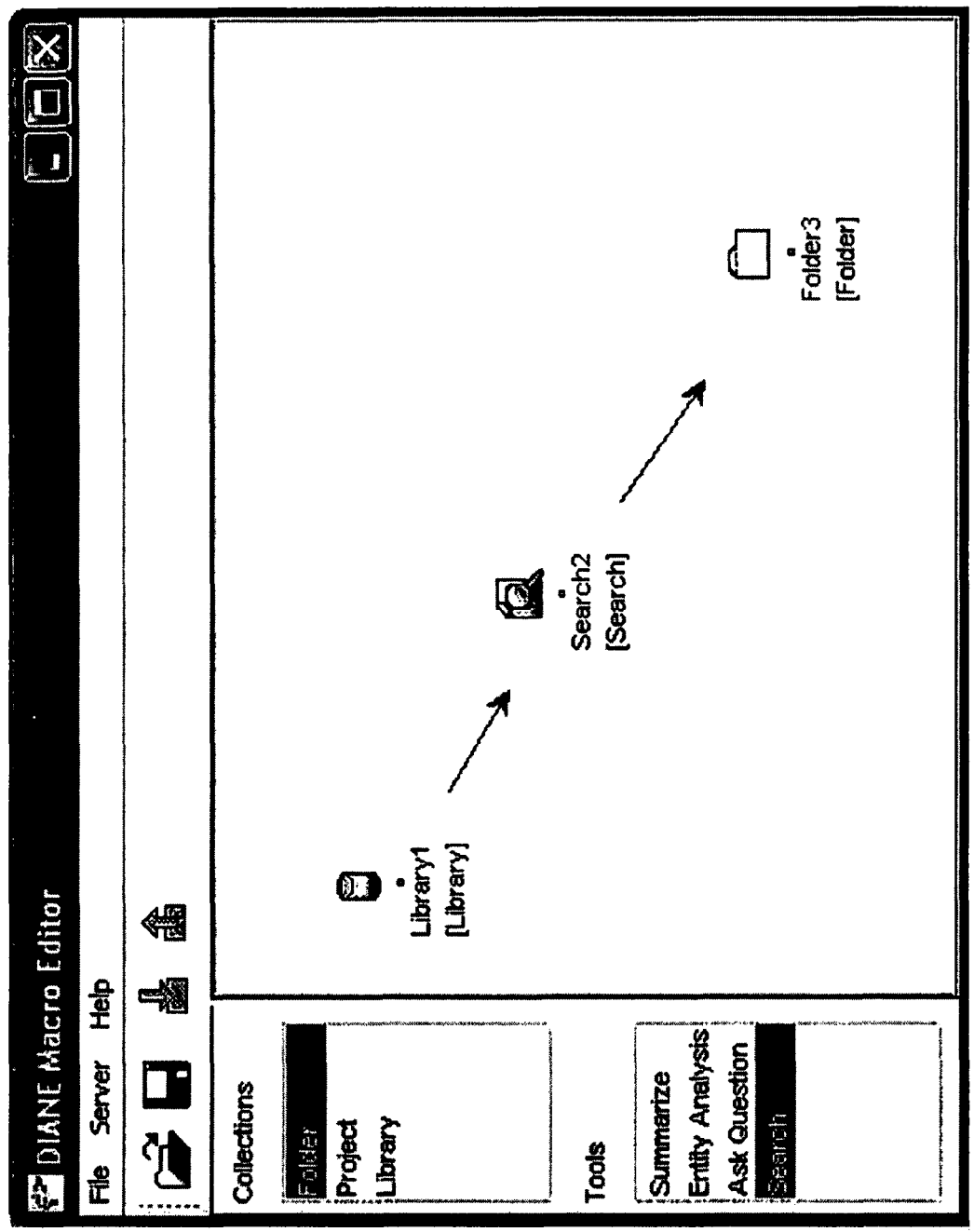
FIG. 15 illustrates an exemplary macro editing workspace according to one embodiment of the present invention.

Using a macro tool, a user can define an operation that includes the execution of a series of commands. To create a macro, a user can, using a macro tool available from the user interface installed on a host computer 10, select from a plurality of available actions (actions installed on the central data processor 40 such as, for example, the data processing unit 100). The user is able to select the actions from a drop-down menu available on the user interface. Alternatively, the user is able to select the actions by "dragging" icons of the available actions onto a work area within the user interface, creating a virtual flowchart of actions to be performed by the central data processor 40, as shown in FIG. 15. In FIG. 15, a macro is created that would result in a source Library1 being searched using search terms specified in Search2, with the results of the search of Library1 being stored in Folder3. The macro in FIG. 15 may be scheduled to be performed on any schedule.

A macro may also be created when the central data processor 40 tracks and records a user's actions for future use. Generally, this automatic macro creation feature functions when a user performs a series of actions (searches and data processing operations using the data processing unit 100) and then, prior to starting a new project, the user is queried as to whether the user would like to save the recorded actions as a macro.

Because macros may be defined to run periodically and to thus update processing results periodically, a macro is also able to be defined so as to alert a user if a user-specified event or occurrence is discovered by one or more monitors executed by the macro. In this way, a user can set up a macro and then even forget about the data being collected and processed by the macro until a triggering event occurs and is recorded by the one or more monitors run by the macro. Once the event occurs, the user is alerted and the user can then act accordingly.

As the user becomes more knowledgeable concerning the searched subject, the user can apply the learned knowledge to create scenario models and associated monitors to identify the occurrence or likely occurrence of an event or events (step 952). The scenario building process is further described below.

Envisioned for use within method 900 are a series of visualizations for visualizing and manipulating the output of the various analytic engines 110-180, such as at step 932. As mentioned above, the user interface is configured to render the visualization of data processed by the central data processor 40. However, because visualization generally occurs at the host computer 10 and not at the central data processor 40, the central data processor 40 must format or package the processed data in a format readable by the user interface using the data formatting unit 176. The user interface must receive data formatted in such a way that a user using the user interface can choose to have the data visualized in any visualization method available in the user interface.

FIG. 6 illustrates an example of a visualization model such as for use with entity extraction module 110 or watch-list module 180. Referring to FIG. 6, a user may wish to view the relevancy of a particular entity with respect to a particular subject matter. For example, a user could send a document set to the entity extraction module 110, which would respond with a list of entities contained within the documents. In one example, the entity extraction module 110 may be configured to extract countries from the inputted documents, and the results displayed to the user. The pie chart shown in FIG. 6 is one example of the results of such an analysis.

In another embodiment, the entity extraction module 110 may be configured to extract multiple categories of entities, such as is shown in FIGS. 16 and 17. In particular, FIG. 16 shows an example of the results of the entity extraction engine displayed on a bar chart, while FIG. 17 shows an example of the results of the entity extraction engine displayed on a pie chart. In either example, the user interface would allow the user to identify specific categories 1710 or entities 1720 from the display, and filter out (i.e., hide) unselected items. For example, the pie chart shown in FIG. 6 may be the result of selecting "locations" in FIG. 16 or 17, and filtering the entity set for view in a pie chart. The pie chart shown in FIG. 6 is one example of the results of such a process if a user were to select and filter the entity set by the category "Countries." In FIG. 6, 'China' might represent the largest piece of the pie chart, meaning that of all countries mentioned within the data documents searched with regards to avian flu, China was the country mentioned the most. Other countries that have had fewer instances of the avian flu are also shown in the pie chart of FIG. 6, meaning that the other countries were mentioned less frequently in the searched data documents 30a processed by the central data processor 40. The relative size of the pie chart slices may also be indicative of specific aspects of entities. For example, instead of showing the frequency of occurrence of each entity in the searched documents, the pie chart of FIG. 6 could show the relative frequency of events (such as avian flu outbreaks) in the specific countries. Such a visualization might require processed data from the entity extraction engine 110.

It is preferred, though not necessary, that in any of these visualizations 6, 16 and 17, the document set is also displayed to the user, and as specific entities or categories of entities are selected in the pie or bar chart, the document set is filtered to show only the subset of documents containing the selected entities or categories. In this way the user can easily identify and select subsets of document either to save off to a project or folder or to use for an iteration of method 900. It must be appreciated that other types of charts may also be used to illustrate the data extracted from the above described processing operations such as, for example, a graph, a bar chart, etc.

FIG. 7 illustrates an exemplary visualization such as for display of the results of entity network engine 120. As mentioned earlier, entities may include people (e.g., names), locations (e.g., countries, cities, towns, etc.), organizations (e.g., U.N., U.S.P.T.O., Red Cross, etc.), dates (e.g., years, months, times, etc.), percentages, dollar amounts and/or concepts (e.g., power, control, etc.). Once an entity is extracted via the entity extraction engine 110 (or alternatively by the entity network module), it is possible to have an entity displayed on the entity network. Two or more entities that share a particular relationship can be networked together visually by drawing a line between the two entities. The relationship line is drawn as an arrow pointing in the direction of one entity and away from the other entity. The arrow may indicate the order the entities were mentioned in a document 30a, and/or the type of relationship (as described above). For example, if "PERSON went to LOCATION" then the arrow is pointed away from "PERSON" and towards "LOCATION" as indicated in FIG. 7

The relationships connecting entities may have one or more words describing the relationship (not shown). For example, if "PERSON traveled to LOCATION", then the relationship line may have the words "traveled" or "traveled to" alongside of the relationship line. Examples of visual relationship indicators include a line drawn between two entities. Other examples include a word placed alongside of the line to illustrate the line's purpose. For example, the word "performed" or "at" or the phrase "performed at" may be placed alongside the line connecting 'Shakespeare' with 'the Globe' to create a reference that provides a user with an easy understanding of how the two entities are related. In addition, the relationship lines include an arrow pointing towards one entity and away from the other. The arrow is configured to indicate the order the entities were introduced by pointing towards the latter introduced entity, or the arrow may indicate a subject and object of the verb relationship. Arrows may also be used to indicate that one entity exerts influence over another entity, as determined by the relationship between the entities. The degree and type of influence is represented by both the thickness and color of the line. As will be described in further detail below, a monitoring feature is configured to invoke other types of relationship displays that would be useful for the user to recognize the new and updated data displayed.

In the example of FIG. 7, the seven different types of entities illustrated are all connected to a common location. This is one example of an entity network, and others may instead have, for example, a person or organization as the most shared entity. Also, the different shapes may be icons that are mapped to the entity names to make it more aesthetically pleasing to a user to differentiate between different types of entities. Other examples could include any type of indicator or icon used to represent an entity. For example, a person or portrait of a person is capable of being used to illustrate an entity having a person's name. Further, it is possible to incorporate more advanced representational features, for example, hair or eye color of a person may be automatically changed to match a well known individual, or allowing a user to change the hair color or eye color manually.

Figure 13:
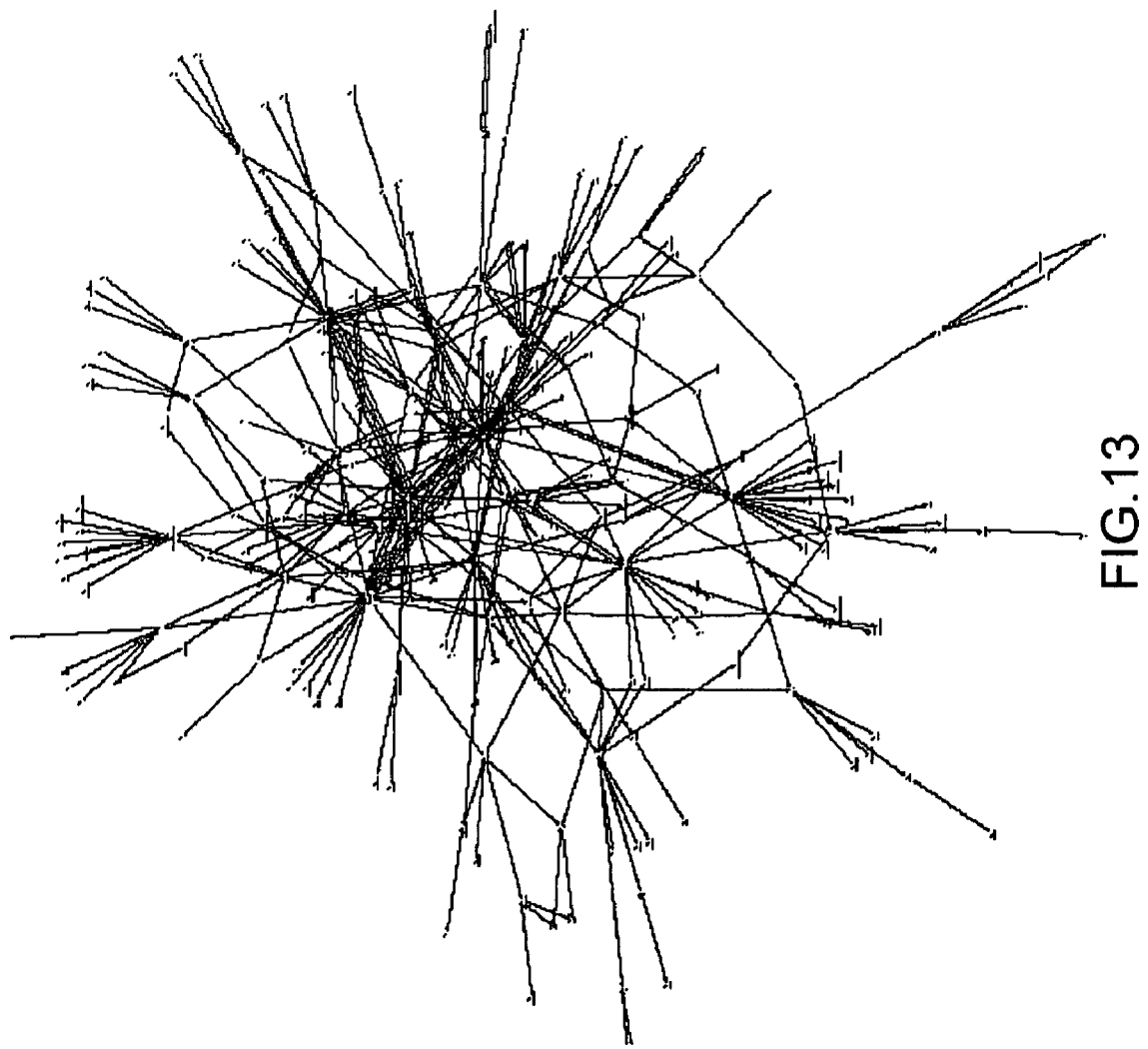
FIG. 13 illustrate exemplary entity network maps according to one embodiment of the present invention.
Figure 14:
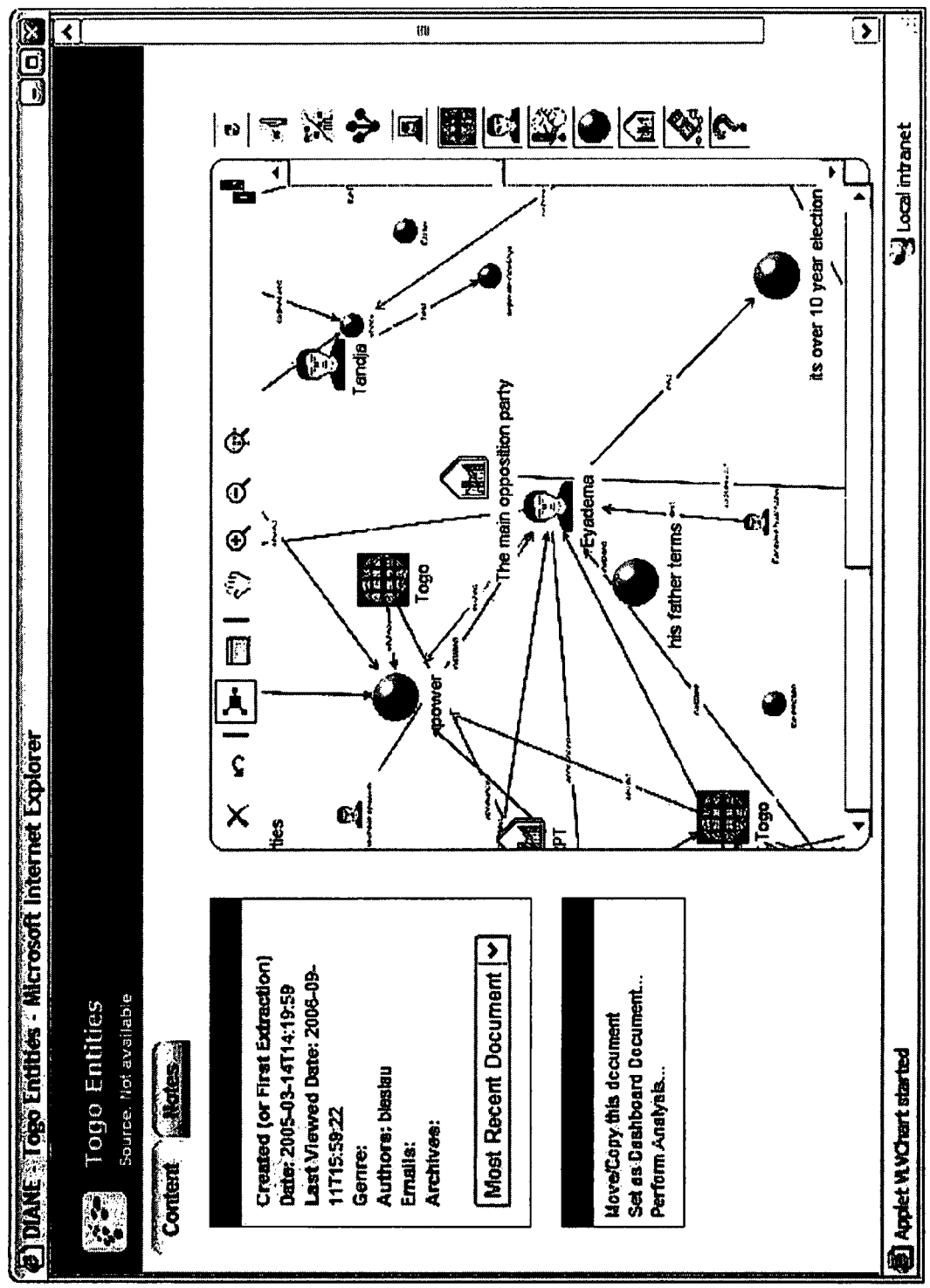
FIG. 14 illustrate exemplary entity network maps according to one embodiment of the present invention.

Another example of a visualization of an entity network is shown in FIGS. 13 and 14. FIG. 14 depicts a zoomed-out view of a large entity network. Each node in the network represents an entity. The connecting lines between each entity represent relationships between the entities. In FIG. 13, a zoomed-in view of the same entity network is shown. Entities are shown by representative icons. Important entities are shown as large icons while less important entities are shown as small icons. Relationships between entities are shown as arrows with descriptive captions.

Figure 18:
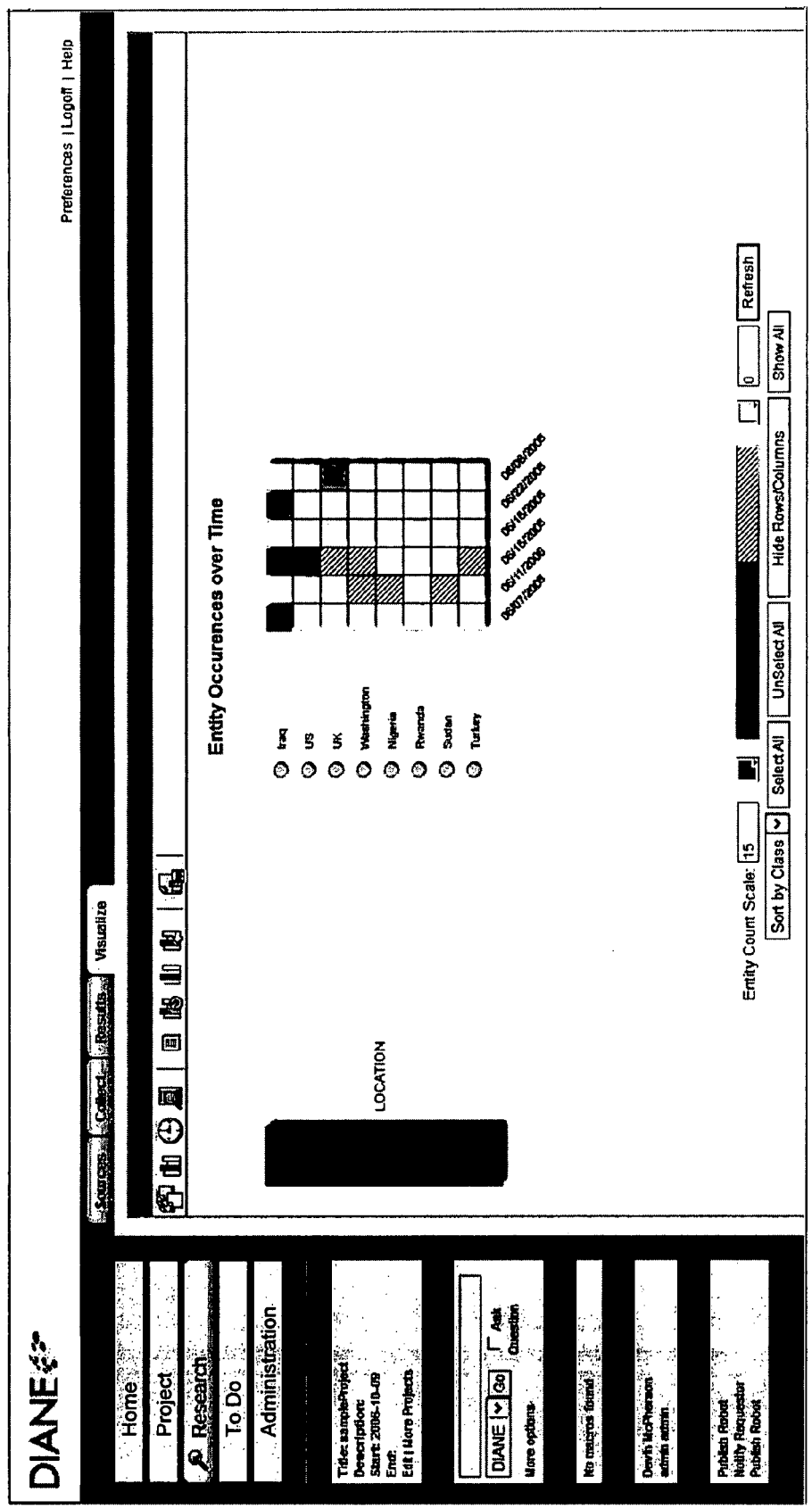
FIG. 18 illustrates an exemplary heat map according to one embodiment of the present invention.
Figure 19:
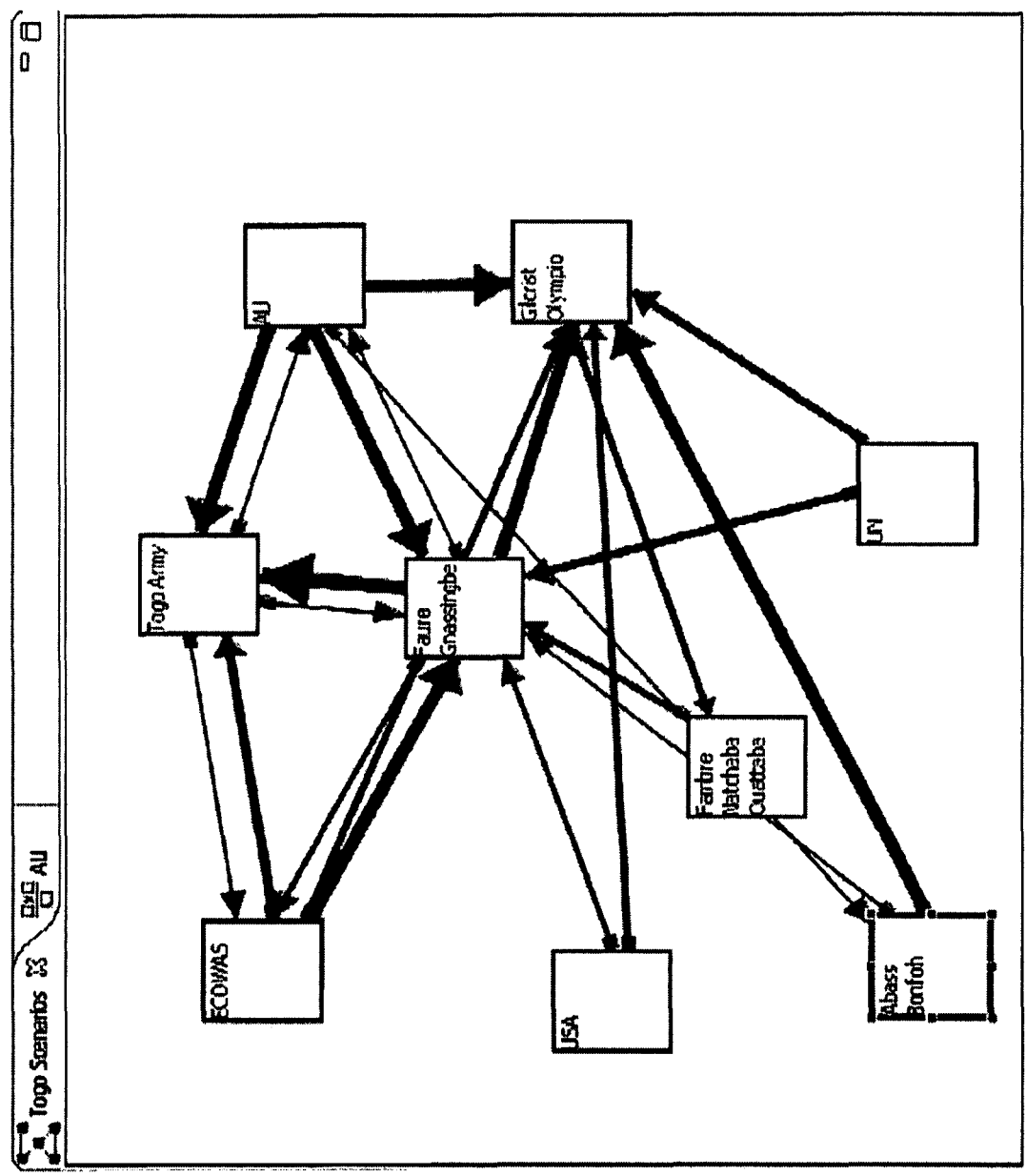

FIG. 18 depicts an example of a heat-map visualization such as for the display of the output of the temporal analysis module. In one embodiment, a heat-map is a chart, which shows the frequency that an entity is mentioned in the searched data documents 30a over time. Like the timeline chart already described, a heat-map shows one entity for each horizontal band. The vertical bands represent time periods. However, instead of showing event concordance (as is done in the above-described timeline chart), each resulting grid box is color-coded to indicate how many times the respective entity was found within the data documents 30a for the respective time period. For example, the total number of references to each entity may be identified by the temporal analysis engine. In this way, those entities mentioned most on a particular date may be highlighted and the visualizations of the other entities scaled in such a way that a user can easily identify those entities mentioned most, or least over time. One possible visualization is to utilize heat-map colors, for example, the entity mentioned most on a particular time (in FIG. 18, for example, Sudan on Jun. 7, 2006), the color of that box may be represented as the brightest shade of red. As the references to other entities on a given date get fewer, the shade of red may change such that the box representing the entity mentioned the average (or median) number of times will be colored purple, and the box representing the entity mentioned the fewest times on a particular day will be a bright blue (for example, Iraq on Jun. 7, 2006).

As with the pie and bar charts, it is preferred, though not necessary, that in the visualization of FIG. 18, the document set is also displayed to the user, and as specific entities, categories, days, or grid boxes are selected, the document set is filtered to show only the subset of documents containing the selected entities or categories. In this way the user can easily identify and select subsets of document either to save off to a project or folder or to use for an iteration of method 900.

Using the above-described data extraction, processing and visualization tools, and the steps of method 900, a user can acquire an understanding as to what factors influence specific entities and how these factors and entities interplay during specific events. The totality of the factors and relationships may be incorporated into a model of a system or scenario, which the system is capable of monitoring for the emergence of a particular scenario.

Figure 20:
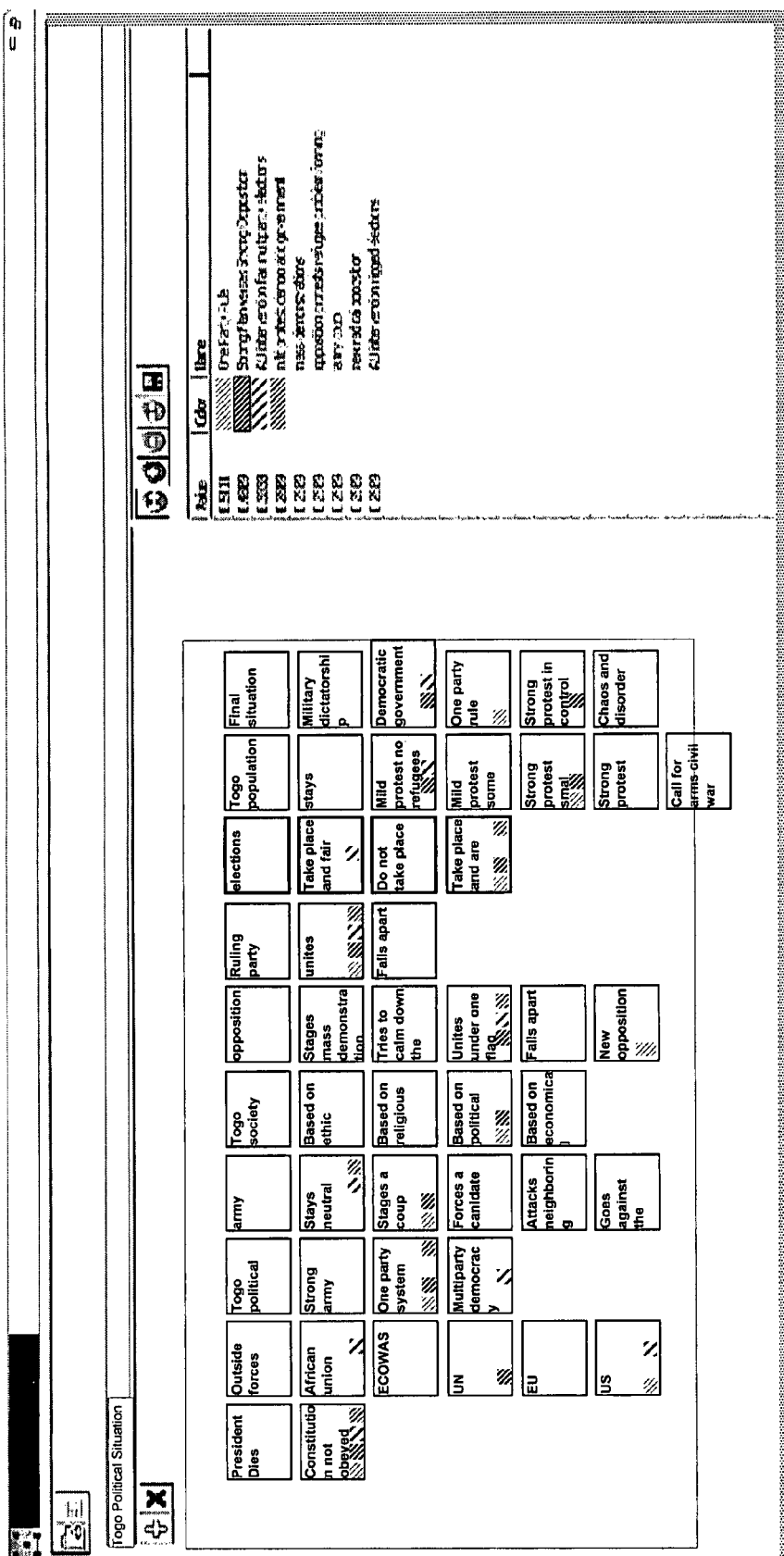
FIG. 20 illustrate an exemplary system map according to one embodiment of the present invention.

Using scenario building tool 198, a user may create system maps, an example of which is shown in FIG. 20. A system map is used to model a system in which specific factors affect other factors, which may in turn affect other factors, thus giving rise to specific scenario(s).

For example, a user might envision a scenario wherein there is a national shortage of citrus fruits. To create a system map, the user may determine what factors would cause or at least influence a national shortage of citrus fruits. Factors may, on the one hand, be parties, such as entities, in the scenario, however, it is preferred that the factors be identified by a noun-verb combination. Using such a noun-verb combination will reduce the possible options for each factor in later steps of the analysis process, thus reducing complexity. For example, if the factor represented in the scenario was "citrus crop," the number of possible options, that is changes, activities or effects of those changes or activities may be virtually limitless. However, identifying the factor as "citrus crop failure" reduces the number of possible options associated with that factor.

In the present example, one factor would be a drought conditions in California. Another factor might be availability of immigrant labor to harvest. Or high cost of fuel for transport to market. Depending on the relative size of both the California and Florida citrus fruits markets, each of these factors would be assigned a weight indicative of the factor's ability to influence the scenario outcome. Various weather factors might be considered. In the Florida dependency branch, hurricanes and unusual frosts might be assigned high influence factors, while air pollution and drought may be assigned lesser influence values. In the California dependency branch, hurricanes may not be assigned as great an influence value. Other factors might include pests, invasive species and fires. Still other factors may include the financial profit of citrus fruit farming in recent years, foreign markets and transportation and storage costs. Each factor is assigned an influence value and a place within the system map. When the system map is fully populated, and given a series of assertions about the options of the nodes of a system map, and a set of consistency values that have been entered in pair-wise fashion, the user sees consistent configurations of other node options. Different scenarios that share some of the same factors may also be placed on the same scenario dependency chart, thus creating a broad picture for the user as to what factors and events may result in specific scenarios occurring. Such a chart is capable of leading a user to conclude that certain scenarios are much more likely to occur than other scenarios, based on the factors shared by the scenarios and the influence values of the shared factors. Thus, a user will have a better basis to determine which scenarios should be protected against through the investment of limited funds and time and resources.

FIG. 20 illustrates an exemplary system map modeling the political system in the country of Togo. In this example, the factors would be represented as the nodes in the relationship network. The relationships between the nodes would be assigned the influence values, which may be represented in any manner on the system map, but, in the present example, are indicated by the width of the relationship line. In FIG. 20, the Togo Army factor mildly impacts or affects the state of the ECOWAS, AU, and Faure Gnassingbe factors, but is heavily impacted by them. The degree of influence that a factor asserts over other factors or the degree to which a factor is influenced by other factors may then be calculated with reference to those factors that affect it, which in turn may be calculated with reference to those factors that affect it, and so on (i.e., those nodes that have an influence on it). Influential nodes are levers you can use to move the system; influenced nodes are the ones that move.

The system map, such as shown in FIG. 20 may, on the one hand be populated by a user from insights gleaned from the analysis of the document sets according to method 900. Alternatively, one or more of the analytic tools, such as entity network tool 120, may be utilized to populate a system map. To accomplish this, the results of entity extraction or entity network engine may be related, via an ontology, to concepts, wherein the concepts may be reflected as factors on the system map. Similarly the relationships may be extracted in a manner such as by the entity network module. Preferably, the user will have the ability to modify, improve or complete the map. For example, identifying the strengths or weights of the relationships in a system model is a highly subjective process that may be best left to user input. Algorithms and software capable of mapping the entities to concepts (factors) within a system map are well known in the art. For example, Cyc and Princeton's Wordnet are examples of software tools useful for this purpose.

Figure 21:
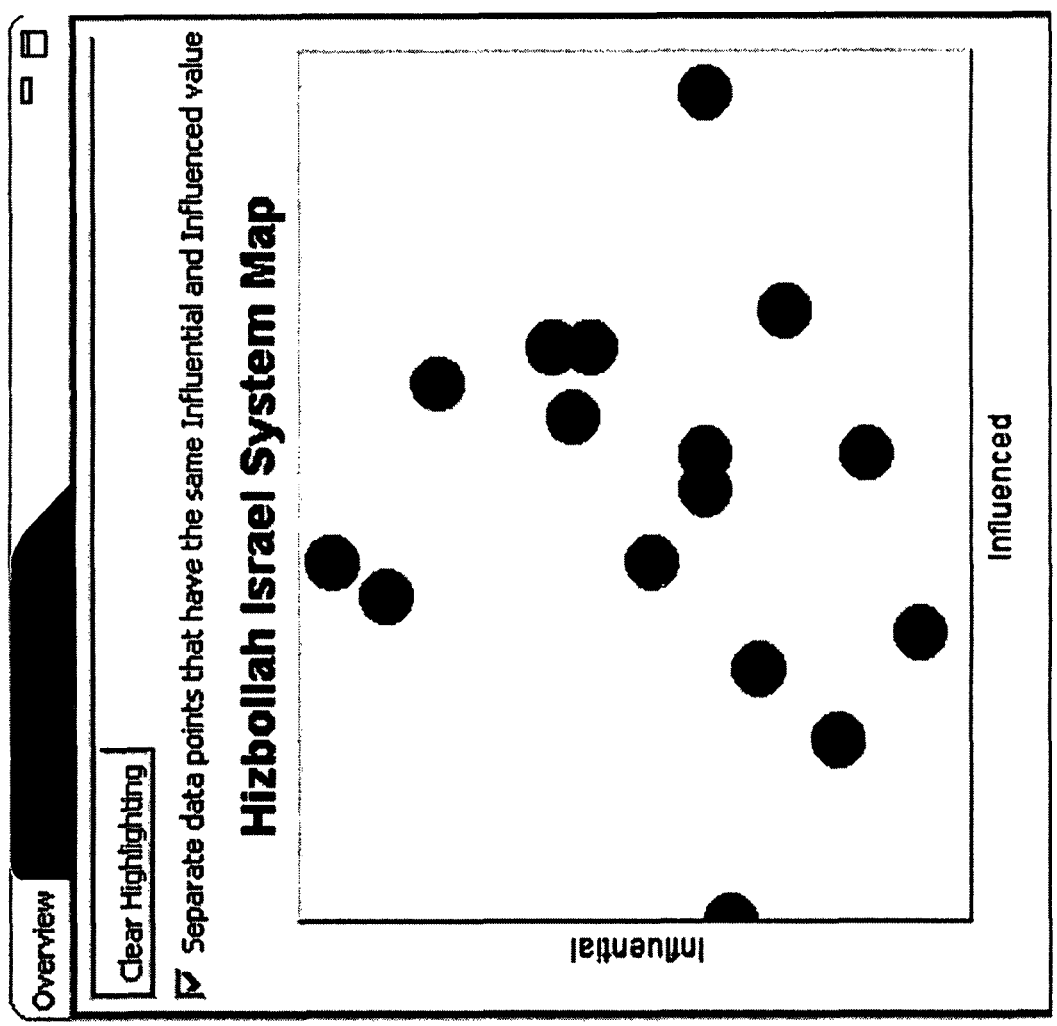
FIG. 21 illustrates an exemplary scenario option space grid according to one embodiment of the present invention.

Once the system map has been created to model the scenario, a user identifies an option space derived from that system map. An exemplary embodiment of an option space is shown in FIG. 21. In FIG. 21, the factors are identified across the top—"President dies," "outside forces," "Political situation", for example. These factors are each identified on the system map as nodes (NOTE: the exemplary option space of FIG. 21 is not derived from system map of FIG. 20). An option is a value for a factor. For example, for the factor "Rule of Law," options may range from "constitutional protections" to "anarchy."

Scenarios may be enumerated for each unique combination of states or actions representing the most important factors or entities. A scenario is a trajectory thru the option space. Eg, for each factor, select exactly one of the factor's options. The set of options that results is a scenario. In other words, a scenario includes one state or action for a plurality of entities or factors in the model. In FIG. 21, four scenarios are indicated in the scenario key at the top-right side of the screenshot. Each scenario is comprised of a set of option values across the option space. The scenario need not contain a value for every option in the model. For example, in FIG. 21, "mass demonstrations" may occur if the "president dies" and the "constitution is not obeyed" and the "army" "stages a coup," for example.

Within the option space, the user may identify a end goal or desired outcome of the system, such as by locking the value of one or more options in the option space, to identify the options that are consistent with or required for that outcome.

An influence feedback loop is a closed loop of influence relationships showing how a chain of entities influence each other. Influence feedback loops are either reinforcing or balancing. A reinforcing feedback loop occurs when the product of the link magnitudes in a closed loop of entity relationships is greater than or equal to zero. A balancing feedback loop occurs when the product of the link magnitudes in a closed loop of entity relationships is less than zero. In other words, a balancing feedback loop is a stable system, while a reinforcing feedback loop is an unstable system. One example of an influence feedback loop is shown in FIG. 23.

Influence feedback loops are generated by a graph-theoretic algorithm that determines the most likely path or loop of relationships based on the values of the relationship link magnitudes. The link magnitudes are assigned by a user, but may be automatically changed based on user-defined criteria. For example, if a macro is used to periodically retrieve updated data and run one or more monitors to analyze the retrieved data, the strength of an influence value of a relationship is increased as a result of multiple occurrences of the relationship in the analyzed data.

Figure 22:
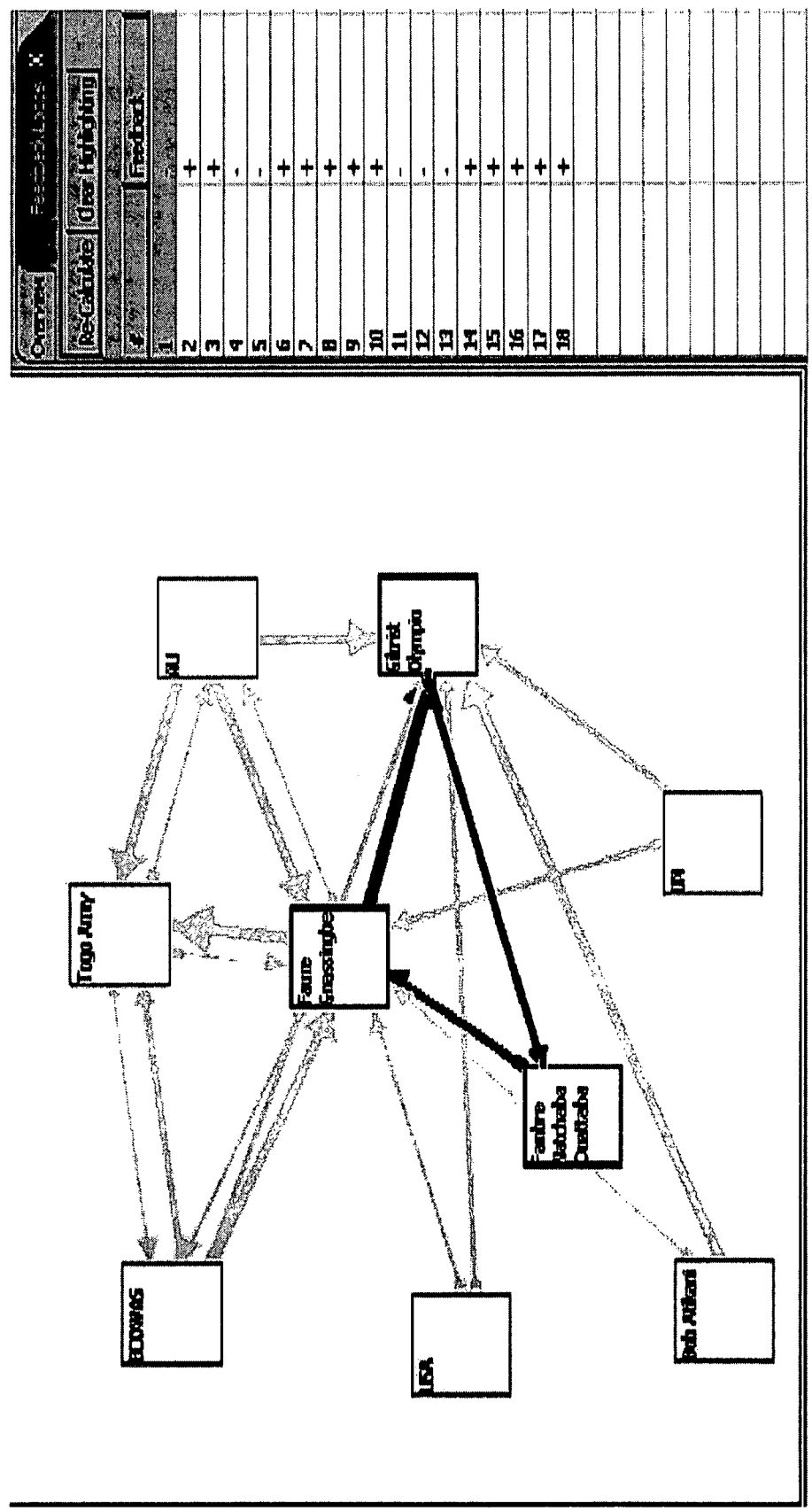
FIG. 22 illustrates an exemplary influence map according to one embodiment of the present invention.

An additional visualization tool is an influence map. FIG. 22 depicts an example of an influence map. An influence map indicates where each extracted entity falls on an influenced/influential scale. In the influence map of FIG. 22, the x-axis represents the degree that an entity is influenced by other entities. The y-axis represents the degree that an entity is able to influence other entities. Thus, the position of an entity (shown as black dots in FIG. 22) on the influence map indicates whether and to what extent the entity is more able to influence or be influenced. The inputs used to identify the influence and influenced coordinates on this visualization may be identified by the relationship strengths discussed above.

By analyzing one or more system maps, option spaces, and influence maps derived from collected and processed data from a set of documents, a user may recognize specific factors that consistently contribute to a scenario result. In other words, the user recognizes the factors that are the most likely symptoms of a given scenario.

Figure 23A:
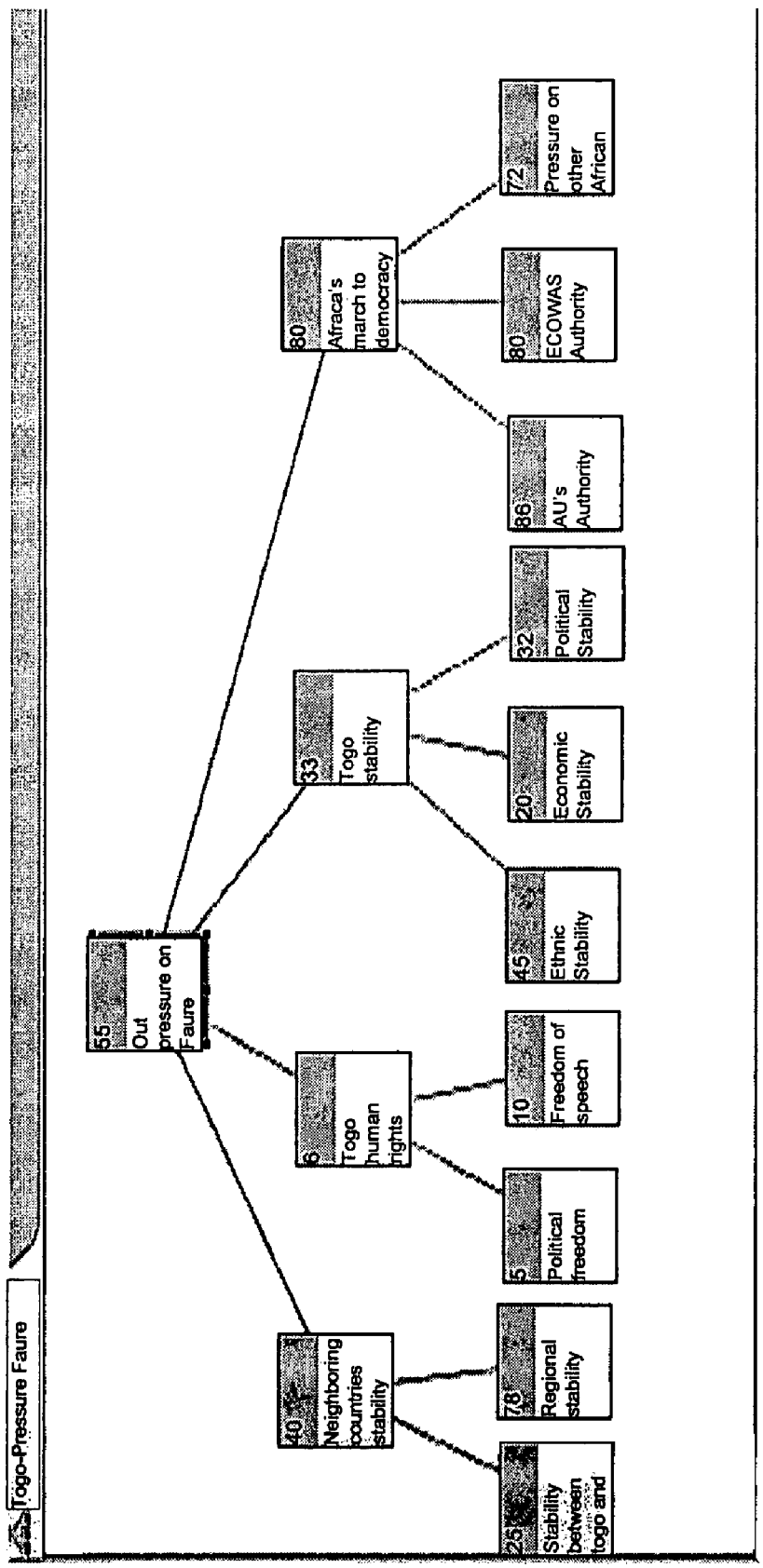
FIGS. 23A and 23B illustrate exemplary risk models according to one embodiment of the present invention.
Figure 23B:
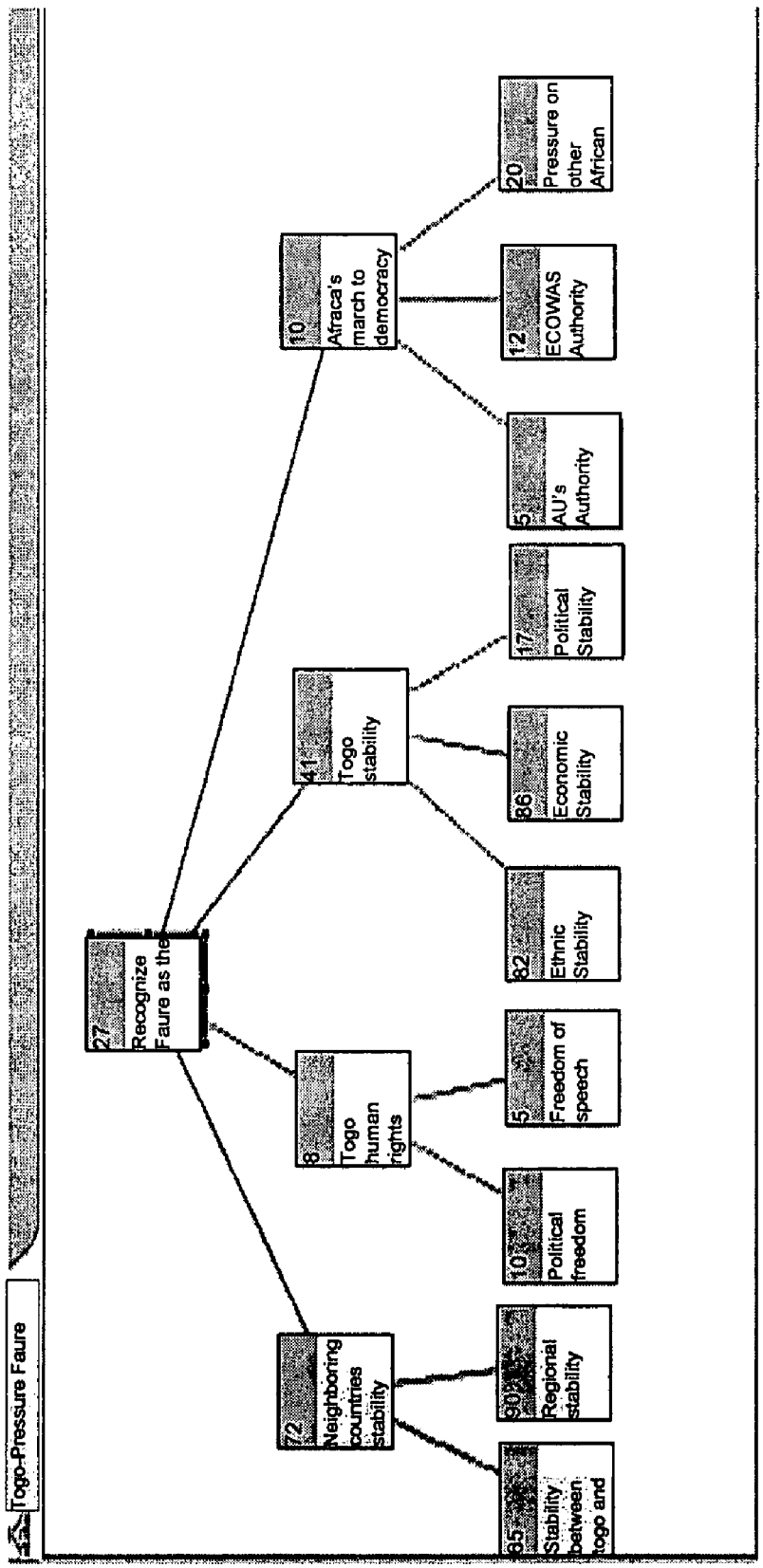

Using the system of the present invention, the user can then automate the analysis of incoming data for the emergence of one or more factors indicative of a desired or undesired outcome. For example, the user may build one or more risk models (FIGS. 23A-23B). Within each risk model, a plurality of the ranking model nodes are placed into a hierarchy of options which influence each other, according to user-defined mathematical algorithms. For example, in the Risk Model shown in FIG. 23A, "political freedom" and "freedom of speech" both affect "human rights." In the example, the current value of "Political freedom" is "5," which denotes the state of that option. Accordingly, the current value of "freedom of speech" is "10." These options, when in the present states associated with these numerical values cause the mathematical formula to update the value associated with "Togo human rights." This change in value propagates up the chart to the top-most node. It is important to note that the risk models themselves are hierarchical. That is, any node may be itself be indicative of another risk model. As the lower level value changes are propagated up the hierarchy, eventually the top most node will identify the potential for a desired/undesired outcome within the system.

A node may be associated with an option within the option space, where the association includes a value to be used if the associated option becomes activated during the monitoring cycle. In this way, a user may either manually, or, preferably, using a macro, use the analysis method 900 to scan the incoming document set(s), such as those containing news reports, blog items, etc., for the occurrence of that option. For example, a macro may be set up to continually search newly gathered data for instances of speech being curtailed (Se FIG. 23A, for which there is no shown associated option space). If the macro determines that a threshold level of mentions of a entity or relationship are identified within the documents and/or analytic tool results, the macro may cause the node in the risk model associated with the option to be changed to the associated value. This value will cause the values of the nodes above it to be changed, ultimately propagating to the top most node. The value associated with that top-most node can then be displayed to the user on a "dashboard," such as a dial that shows the value as red for a top-most value indicative of an undesired outcome, or green for a value indicative of a desired outcome.

The example that follows and that is shown in FIGS. 22-30 illustrates some of the benefits of using the method described in FIG. 9. The example reflects how a collaborative group of users on various host computers 10 with the installed web browser or GUI 5 could interact with a central data processor 40 to better analyze, understand and act in the face of a major event. The example is, however, for demonstration purposes only and is not meant to limit, in any way, the scope of this disclosure.

In response to a growing regional crisis, an intelligence organization charged with monitoring the affected region must efficiently collect data relevant to the crisis and then determine how best to act. While typical search engines are useful for collecting massive amounts of data, the resulting challenge is in managing and processing the collected data. In order to do so, the team leader accesses a host computer 10 with the described web browser or GUI 5 installed through which the team leader is able to interact with the central data processor 40.

One of the first tasks the team leader does is to instruct the central data processor 40 to execute a search of existing data sources. The search can be directed to as many data sources as the team leader desires, though, alternatively the user may desire to access pre-fetched information. Likely, the team leader will collaborate with other team members, all experts on the pending issues, to determine a set of reliable data sources that will adequately report the ongoing events in the region. For this particular search, data sources might include Internet news sites, blogs, or other news reporting data sources. Various team members will also provide the initial search terms, based on personal experience and expertise. In fact, the team leader may assign roles to individual team members based on their individual expertise. In order to implement this, the team leader instructs the central data processor 40 to allow all permitted team members to access the emerging work product, stored on the central data processor 40. Then, with each team member granted access rights to the work product, team members simultaneously input search terms to the central data processor 40 from individual host computers. A resultant search is then conducted of the selected data sources using the input search terms. The data documents returned by the search are displayed to all team members as a listing of results.

From the returned documents, team members determine which data documents are most relevant to both the situation and the team member's individual expertise. Team members determine relevancy by either accessing the data document and analyzing it themselves or, preferably, by utilizing one or more of the analysis engines, such as the question/answer engine or the summarization engine. Each team member selects the data documents that are most relevant in order to create a collection of most relevant documents. The contents of these documents are selected to be copied to the work product project or folder on the central data processor. Access to the project or individual folders within it may be limited to certain individuals or roles based upon permission schemes, such as those well known in the art.

With the identified set of relevant documents, the team may execute one or more analysis engines such as the entity and network extraction engines on the relevant documents. The resulting entities and relationships may thus be extracted and saved into the relational database. Team members then use the various visualization tools to determine what or who the most common entities are and also what relationships exist between the entities. As described above, entities may be visualized using bar charts and pie charts (see, e.g., FIGS. 16, 17). Alternatively, the timeline engine, may be used to generate a timeline showing temporal relationships between extracted entities (see, e.g., FIGS. 11, 12). A heat-map is also used to indicate to identify information velocity, that is, the most frequently encountered entities over various time periods (see, e.g., FIG. 18). Additionally, a entity network map is used to visualize the relationships between entities (see, e.g., FIGS. 14A, 14B).

Either from the entity network engine, or from user knowledge gleaned from the analytic results, a system map can be created, and for each entity relationship, influence assignments made (either manually or according to some predetermined algorithm) so that the degree of influence each entity exerts on another entity is shown. An influence map may then be used to determine the most influential and influenced entities (see, e.g., FIG. 22). Influence loops may also identified on the entity network map. Both stable and unstable influence loops are highlighted. FIGS. 20 and 23 show an example of an influence loop. FIG. 20 depicts a simplified entity network map with influence relationships identifying the relationships between entities. FIG. 23 depicts a single influence loop that exists between three entities in the entity network map of FIG. 20. The influence loop of FIG. 23 indicates that the entity Faure Gnassingbe strongly influences the entity Gilcrist Olympio. The other two influence relationships shown are not as strong.

Using each of these engines and visualizations, team members are able to determine the most important entities in relation to the regional crisis. The most important entities may then be included in a watch list for sharing with other users. Alternatively, the watch lists may also be used as search terms and/or filters on the analysis engines as described above, allowing the user to refine the analysis over subsequent iterations. Team members may also utilize the macro tool to create a automate such repeated iterations either with or without the watch lists, thus effectively updating the identified data sources, while allowing the user to move on to analysis of other data sources, refining the analysis of current data sources, and/or performing scenario building or other visualization/realization of the extracted results. Moreover, as such processes are updated, the updated processed data may be re-visualized so as to highlight the latest changes to the processed data.

Either upon completion of the initial iteration, or upon the completion of subsequent iterations, team members may be able to identify potential states or actions (options) for each of the identified factors. Using a scenario option space grid as shown in FIG. 21, the most important entities or factors may be displayed with a listing of correlating factor states or actions. For each factor, at least one state or action is identified or selected. The combination of states or actions selected from each factor may comprise a scenario. Thus, a scenario option space grid with only three factors, with each factor having only three states or actions, could result in up to $3^3$ or 27 different scenarios. As most situations, including the situation described by the scenario option space grid of FIG. 21, involve more than three factors and have more than three states, the potential number of scenarios is very large. As a result, team members, either manually or using a predefined algorithm, may select only those scenarios that are most interesting for the given situation.

Once a scenario has been selected, a risk model may be generated. FIGS. 23A and B show two different risk models may arise from the same situation. Both risk models show a scenario outcome which defines the scenario and also a hierarchy of factors that influence the scenario. Each risk model node may be connected to options in the scenario option space. Each node is also assigned a mathematical formula indicative of how the lower level nodes affect it.

With a series of potential scenarios to choose from, team members are able to determine specific scenarios which are preferred and also specific scenarios which are to be avoided. Team members can then determine which of the supporting factors are most likely to influence the outcome of the specific scenarios. Monitoring of the up-to-date data either through manual analysis (Method 900) or automated analysis using macros to automate the processes of method 900, allow the risk model to identify changes in data and reflect those changes in the overall value of the system. That resultant value can thus indicate to a user what outcome is likely to occur, thus suggesting appropriate action to the intelligence team.

Other improvements to the system are envisioned for use in method 900. For example, by storing a user's search terms and results, as well as data processing results (such as a relational database 174) on the central data processor 40, the user is able to access the data and results from multiple host computers 10 as long as each used host computer 10 has the required user interface installed. The search terms and results may be stored within user-defined projects or folders stored on the central data processor 40. In this way, the search results and other project work product may be accessible to a number of users if the creator of the project folder sets access privileges for the additional users. In addition, the UI would, in one embodiment, provide access to all of the visualization tools, allowing the user(s) with access to the project/folder structure to organize documents and data in their own way, and to send the data to search tools, without regard to whether or not the documents were all returned by a single search.

For example, additional users are able to be granted access the search terms and results and data processing results of a first user if the first user sets appropriate privileges for the additional users. In other words, by storing the data processing unit 100 and processed data results on the central data processor 40, collaborative groups of users may be organized wherein each member of a collaborative group has real-time access to the latest data collection and processing results of the other members of the group.

Collaborative groups are capable of sharing not only data and results, but also tasks, projects, and folders. Any member of a collaborative group may be allowed by a group administrator to give input regarding raw data documents or processed data. The input may be shared among users according to the privileges established by the group administrator. Data, processing results, and additional tasks are capable of being made available or assigned to specific members or groups of members in the collaborative group. Individual members are assigned roles so that all role-specific tasks can be routed only to the correct member(s). All privileges, role assignments and other organizational aspects of groups are stored on the central data processor 40.

As an example, a collaborative group is capable of having multiple users where each user is an expert in a different geographic zone for the group's subject matter. A terrorism group, for example, may have an expert on terrorism in the Middle East, one in the Philippines, one in Indonesia, one in Western Europe, one in Eastern Europe and one in North America. Because each expert is a member of the same collaborative group, a user in North America could perform some research and then request that the research be updated by the expert in the Philippines. Alternatively, the user could request that the research be updated by a user from Southeast Asia, such that either the expert in the Philippines or the expert in Indonesia could accept the task. The request remains stored on the central data processor 40 until a user accepts the request. When a user accepts a task, the stored request is tagged so that the other members of the collaborative group will be able to see that the task has been accepted and is no longer available for acceptance by other members. It is also conceivable that a user who is not a member of a collaborative group could send a request to an administrator of a collaborative group, seeking either help on a research project or access to the group's research results. The group administrator would have the ability to either accept or reject the request.

Watch lists may also be created by one or more users in a collaborative group, wherein a member of a group determines that a certain group key words or entities, possibly including synonyms or "also known as," encapsulates an important set of knowledge on a particular subject. Such a list, once compiled, may be used as search terms for a search, the entities to be extracted by the watchlist module 180, the themes on a timeline created by timeline module 130, or as a filter on the input or results of any one or more of the analysis engines. Other members of the collaborative group are able to modify or use the same watch lists. Watch lists enable all members of a collaborative group to know what search terms are being used by others for periodic monitoring of data sources.

When any type of periodic monitoring is used, the central data processor 40 not only searches the user-specified data sources, but the central data processor 40 is configured to also perform various data processing operations with either the newly found data or an updated data set incorporating the newly found data. The specific data processing operations performed and the order and frequency of their performance may be specified in a user-defined macro. The macro could, for example, define what data sources to search and how often the sources should be searched. The macro could also determine which data processing unit 100 should be used in a periodic analysis of the collected data, as well as how the newly processed data should be visualized (if at all). As mentioned above, newly collected data is visualized with previously collected data in a way that emphasizes the newly collected data (by color or shade, for example).

Furthermore, one or more of the processes used in the present system may require Business Process Management tools. For example, the role of data analysts may be to perform the search and initial analysis, which will be handed off to system modelers for scenario building, which may ultimately be handed off to macro experts for creation of macros to monitor individual options. In order to manage, and ultimately report on, the passing of information from each supplier to each consumer in the chain, the business process management engine may be used to prevent data from prematurely being handed off to the consumer, and to notify a consumer once the data is ready for consumption. Business process management tools are well known in the industry, and may be used to automate any number of tasks in the system from handing off of data to different consumers to setting up robots, requesting and ingesting new document sets, adding new users, or requesting Administrative tasks of a system administrator, for example.

The ability to anticipate possible future events is useful in many industries and applications. The given scenario dependency chart example concerning citrus fruits shows the practicality of using the above-described methods to more efficiently manage agricultural markets. For example, if, using a scenario dependency chart, a citrus fruit expert determines that droughts pose a greater threat to citrus fruit farming than invasive species, then the citrus fruit expert can recommend that more resources be devoted to developing drought-resistant fruit or developing emergency water reserves and fewer resources be devoted to pesticides or invasive species abatement. Similar scenario dependency charts can be made for almost any agricultural product. Thus, through efficient management of the processing of unstructured data, as explained above, agricultural market analysts can better allocate resources in anticipation of possible scenarios.

Efficient management of data processing and scenario anticipation are useful in other industry sectors as well. Many examples mentioned above have referred to terrorism or national security. National security experts can more effectively anticipate future security issues such as terrorist events by not just collecting network data relating to terrorism, but also processing the data in a way that makes the amount of collected data manageable and then visualizing the processed data in a way that succinctly shows an expert the most important entities and organizations requiring observation and the most important factors that could result in a national security emergency. Anticipating various national security scenarios and understanding the factors that could result in each scenario as well as the probability of each factor or scenario occurring is crucial for determining where and how to distribute national security resources.

Managing data processing and scenario anticipation is also crucial in financial markets. Financial analysts can only make accurate market evaluations when efficiently supplied with information regarding the factors that most influence the financial markets.

The methods and system described above are also able to be applied to network control and management. For example, managing a transportation and shipping network requires an ability to quickly and frequently collect and analyze data to determine if changes need to occur within the network. Scenario anticipation is also vital so as to allow an operator to know how best to compensate for the occurrence or even high probability of the occurrence of a network-altering event. Other networks that would benefit from the described embodiments include communications networks, power grids and defense networks.

Monitoring and compensating for changes in electronic commerce markets also requires the managed processing of vast amounts of information. Allowing an online auction user to quickly analyze the price variation of related items is also useful. Monitoring and displaying entities extracted from news sources (including informal sources such as blogs and electronic chat rooms) is also desirable for many reasons. For each of these services or industries, efficient management of data processing is crucial for the successful user. Scenario anticipation is also important in knowing how to react to various events. Many other industries also benefit from the above-explained processes.

One of ordinary skill in the art will recognize that the functions performed by central data processor 40 and data processing engine 100 may be implemented such that they are performed by a single computer, such as a network server, or alternatively arrayed such that they are broken out onto numerous servers. As such, one of ordinary skill in the art will recognize that various implementations exist to allow for such separation of modules, such as by implementing the various analysis engines or modules as web services, and employing a service oriented architecture to allow for easy insertion, removal, substitution or movement (such as from one server to another) of individual modules. Moreover, one of ordinary skill in the art will recognize that the functions performed by each of these modules may be implemented as software modules, or as hardware, such as by processors including the instructions necessary for carrying out the respective instructions of the module.

Having described example embodiments throughout the detailed description of the invention, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A system for collaborating research for adding value to information, comprising:
   a memory;
   a central data processor comprising a server on a network with one or more processors in the server and having a search module for searching documents wherein the documents comprise chat dialogs, emails, blogs, and internet sites, the central data processor further comprising:
   an entity extraction module configured to use the one or more processors to extract entities from the documents, wherein the extracted entities comprises relevant nouns, magnitudes, numbers, or concepts contained within the text of the documents;
   a network extraction module configured to use the one or more processors to extract relationships between the extracted entities from the documents; and
   a formatting module using the one or more processors to format the extracted entities and the extracted relationships into a visualization format; and
   at least one host computer having a user interface for communicating with the central data processor, the user interface comprising:
   search tools that use a processor of the at least one host computer to allow a first user of one of the plurality of host computers to communicate a search request to the central data processor, the search request instructing the central data processor to search the documents;

selection tools that use a processor of the at least one host computer to allow the first user to select a subset of the documents returned by the central data processor in response to the search request, and to initiate the communication of the selected subset of documents to the entity extraction module and the network extraction module for data processing;

at least one visualization tool that uses a processor of the at least one host computer to allow the first user's host computer to graphically render the visualization format;

a collaboration tool input that uses a processor of the at least one host computer to allow the first user to give access to the extracted entities, the extracted relationships, and the visualization format to at least one additional remote user of the plurality of host computers; and at least one scenario tool that uses a processor of the at least one host computer to process a system map comprising a system of factors derived from the extracted entities and relationships, wherein factors are related via influence relationships which each represent a direction and magnitude of influence exerted by a first factor onto a second factor, the factors being graphically located on a chart on the user interface having two axes, a first axis indicating a value of influence relationships that exert an influence on the factors located on the chart, and the second axis indicating a value of influence relationships that the factors located on the chart exert on other extracted entities.

2. The system of claim 1, wherein the central data processor further comprises a temporal analysis module configured to extract time information from the documents.

3. The system of claim 2, wherein the user interface further comprises a temporal analysis input tool for allowing the first user to initiate the communication of a subset of the documents to the temporal analysis module on the central data processor.

4. The system of claim 1, wherein the visualization format is an entity network map where at least one of the extracted entities are shown linked to at least one other extracted entity via at least one of the extracted relationships.

5. The system of claim 1, wherein the magnitude and direction of the influence relationship is determined by any user of the plurality of host computers.

6. The system of claim 1, wherein the magnitude and direction of the influence relationship is determined by the central data processor using the extracted relationships.

7. The system of claim 1, wherein at least one factor has an influence relationship magnitude and direction for every other factor connected to it via an extracted relationship.

8. The system of claim 1, wherein at least one factor comprises at least one option, each option comprising a value indicating the state of the option.

9. The system of claim 8, further comprising a risk model comprising at least one node associated with one of the at least one options, and wherein the assigned value of at least one node in the risk model is determined with reference to the assigned value of the at least one associated option.

10. The system of claim 1, wherein the system is used to collaborate research on the allocation of resources.

11. The system of claim 1, wherein the system is used to collaborate research relating to market evaluations.

12. The system of claim 1, wherein the system is used to collaborate research relating to network management.

13. A process for determining a user-specified scenario in order to add value to information, comprising:

searching via a server, a collection of documents to find a document in the collection of documents relevant to a scenario, wherein the documents comprise chat dialogs, emails, blogs, and internet sites;

processing the relevant documents to a scenario using one or more processors at the server to extract entities and relationships between the extracted entities, wherein the extracted entities comprise relevant nouns, magnitudes, numbers, or concepts contained within the text of the documents;

setting influence values for a plurality of the extracted entities to indicate the amount of influence each of the plurality of the extracted entities has on another extracted entity to which an extracted relationship exists;

associating a set of options with the plurality of the extracted entities; and populating a risk model comprising a plurality of nodes derived from the extracted entities, wherein at least one of the plurality of nodes is associated with an option from the set of options, the option including an associated value, the associated value usable for calculating an option value associated with a higher level node in the risk model; and rendering, for display at a user interface of one or more host computers in communication with the server, one or more of the plurality of extracted entities on a chart having two axes, a first axis indicating an amount of influence exerted on the extracted entities located on the chart as represented by the influence values, and the second axis indicating an amount of influence that the extracted entities located on the chart exert on other extracted entities, the amounts of influence being derived from the influence values.

14. The process of claim 13, further comprising graphically viewing the extracted entities and the extracted relationships.

15. The process of claim 13, further comprising updating the influence values and the risk model after repeating the searching, processing, setting, associating and populating using a revised collection of documents.

16. The process of claim 15, wherein the updating is automatically performed as a result of a macro of operations.

17. The process of claim 16, wherein the macro is manually created by a user.

18. The process of claim 16, wherein the macro is created by recording a user's operations.

19. The process of claim 13, wherein the selecting the extracted entities comprises graphically viewing the extracted entities and the extracted relationships.

20. The process of claim 13, wherein the influence values are set manually by a user.

21. The process of claim 13, wherein the influence values are set automatically based on the extracted relationships.

22. The process of claim 13, wherein the processing the relevant data includes extracting time information.

23. The process of claim 14, wherein the graphically viewing includes rendering an entity network map where at least one of the extracted entities are shown linked to at least one other extracted entity via an extracted relationship.

24. The process of claim 13, wherein a magnitude and direction of the influence values is determined by a user.

25. The process of claim 13, wherein a magnitude and direction of the influence values is determined automatically using the extracted relationships.

* * * * *